US012745129B2

(12) United States Patent
Kanamarlapudi et al.

(10) Patent No.: US 12,745,129 B2
(45) Date of Patent: Sep. 22, 2026

(54) BSR CONFIGURATION ENHANCEMENTS

(71) Applicant: QUALCOMM Incorporated, San Diego, CA (US)

(72) Inventors: Sitaramanjaneyulu Kanamarlapudi, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/405,985

(22) Filed: Jan. 5, 2024

(65) Prior Publication Data

US 2024/0244479 A1 Jul. 18, 2024

Related U.S. Application Data

(60) Provisional application No. 63/479,978, filed on Jan. 13, 2023.

(51) Int. Cl.
*H04W 28/02* (2009.01)
*H04L 27/26* (2006.01)
*H04W 84/06* (2009.01)

(52) U.S. Cl.
CPC ... *H04W 28/0278* (2013.01); *H04L 27/26025* (2021.01); *H04W 84/06* (2013.01)

(58) Field of Classification Search
CPC ......... H04W 28/0278; H04W 28/0268; H04W 84/06; H04L 27/26025
See application file for complete search history.

(56) References Cited

U.S. PATENT DOCUMENTS

| | | | | |
|---|---|---|---|---|
| 9,814,045 | B2 * | 11/2017 | Kwon | H04W 76/14 |
| 12,328,717 | B2 * | 6/2025 | Pan | H04W 28/0268 |
| 2011/0242972 | A1 * | 10/2011 | Sebire | H04W 72/1221 370/229 |
| 2013/0107722 | A1 | 5/2013 | Huang | |

(Continued)

FOREIGN PATENT DOCUMENTS

| | | | |
|---|---|---|---|
| CN | 108632883 | B | 8/2020 |
| CN | 116017727 | A | 4/2023 |

(Continued)

OTHER PUBLICATIONS

International Search Report and Written Opinion—PCT/US2024/010710—ISA/EPO—Apr. 22, 2024—11pages.

(Continued)

*Primary Examiner* — Bailor C Hsu
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE obtains multiple buffer status reporting (BSR) tables and multiple sets of one or more timers. Each BSR table of the multiple BSR tables corresponds to one logic channel group (LCG) of multiple LCGs. The UE further communicates with a network entity based on one BSR table selected from the multiple BSR tables and one set of timers selected from the multiple sets of one or more timers. The method enables the UE to obtain multiple BSR tables and BSR timers and select corresponding BSR tables and timers according to specific characteristics of the traffic.

32 Claims, 13 Drawing Sheets

(56) References Cited

U.S. PATENT DOCUMENTS

| | | | | |
|---|---|---|---|---|
| 2019/0150025 | A1 | 5/2019 | Ohta et al. | |
| 2020/0037200 | A1* | 1/2020 | Cho | H04W 72/23 |
| 2020/0137754 | A1 | 4/2020 | Kim et al. | |
| 2020/0146082 | A1* | 5/2020 | Chen | H04W 4/40 |
| 2020/0187046 | A1 | 6/2020 | Bergquist et al. | |
| 2023/0232433 | A1 | 7/2023 | Ohlsson et al. | |
| 2023/0247478 | A1 | 8/2023 | Wang et al. | |
| 2024/0114385 | A1* | 4/2024 | Cheng | H04W 28/0278 |
| 2024/0251286 | A1 | 7/2024 | He | |
| 2025/0071607 | A1* | 2/2025 | Kim | H04W 28/0278 |
| 2025/0220500 | A1* | 7/2025 | Wu | H04W 28/0278 |
| 2025/0358684 | A1* | 11/2025 | Kanamarlapudi | H04W 28/18 |

FOREIGN PATENT DOCUMENTS

| | | | | |
|---|---|---|---|---|
| CN | 116156551 | A | 5/2023 | |
| WO | WO-2022025815 | A1 * | 2/2022 | H04W 28/0278 |
| WO | WO-2024097082 | A1 * | 5/2024 | H04W 72/21 |

OTHER PUBLICATIONS

ETSI: “5G, NR, Medium Access Control (MAC) Protocol Specification (3GPP TS 38.321 version 16.1.0 Release 16)”, ETSI 138 321, V16.1.0, Jul. 2020, pp. 1-152.

* cited by examiner 400
1 bit
LCG ID 402
Buffer Size 404
Oct 1

450
1 bit
Buffer Size #1 452
Buffer Size #2 454
Oct 1
Buffer Size #2 454
Buffer Size #3 456
Oct 2
Buffer Size #3 456
Buffer Size #4 458
Oct 3

475
gap due to Jitter
Non-Integer Cycle
gap due to Jitter
XR Flow 1 472
t0
t1
XR Traffic Burst 1 474
XR Traffic Burst 2 476
gap due to Jitter
Non-Integer Cycle
gap due to Jitter
XR Flow 2 478
XR Traffic Burst
XR Traffic Burst

800

1000

BSR CONFIGURATION ENHANCEMENTS

CROSS REFERENCE TO RELATED APPLICATION(S)

This application claims the benefit of and priority to U.S. Provisional Application Ser. No. 63/479,978, entitled "BSR CONFIGURATION ENHANCEMENTS" and filed on Jan. 13, 2023, which is expressly incorporated by reference herein in its entirety.

TECHNICAL FIELD

The present disclosure relates generally to communication systems, and more particularly, to a Buffer Status Reporting (BSR) for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory, wherein the at least one processor may be configured to carry out certain actions based at least in part on information stored in the memory. The method, computer-readable medium, and apparatus obtain multiple BSR tables and multiple sets of one or more timers, where each BSR table of the multiple BSR tables corresponds to one logic channel group (LCG) of multiple LCGs; and communicate with a network entity based on one BSR table selected from the multiple BSR tables and one set of timers selected from the multiple sets of one or more timers.

In an aspect of the disclosure, a method, a computer-readable medium, and an apparatus are provided for wireless communication at a network entity. The apparatus may include memory and at least one processor coupled to the memory, wherein the at least one processor may be configured to carry out certain actions based at least in part on information stored in the memory. The method, computer-readable medium, and apparatus provide to a UE, an indication for the UE to select one BSR table from multiple BSR tables and select one set of one or more timers from multiple sets of one or more timers, where each BSR table of the multiple BSR tables corresponds to one LCG of multiple LCGs; and communicate with the UE based on the one BSR table and the one set of one or more timers indicated for the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
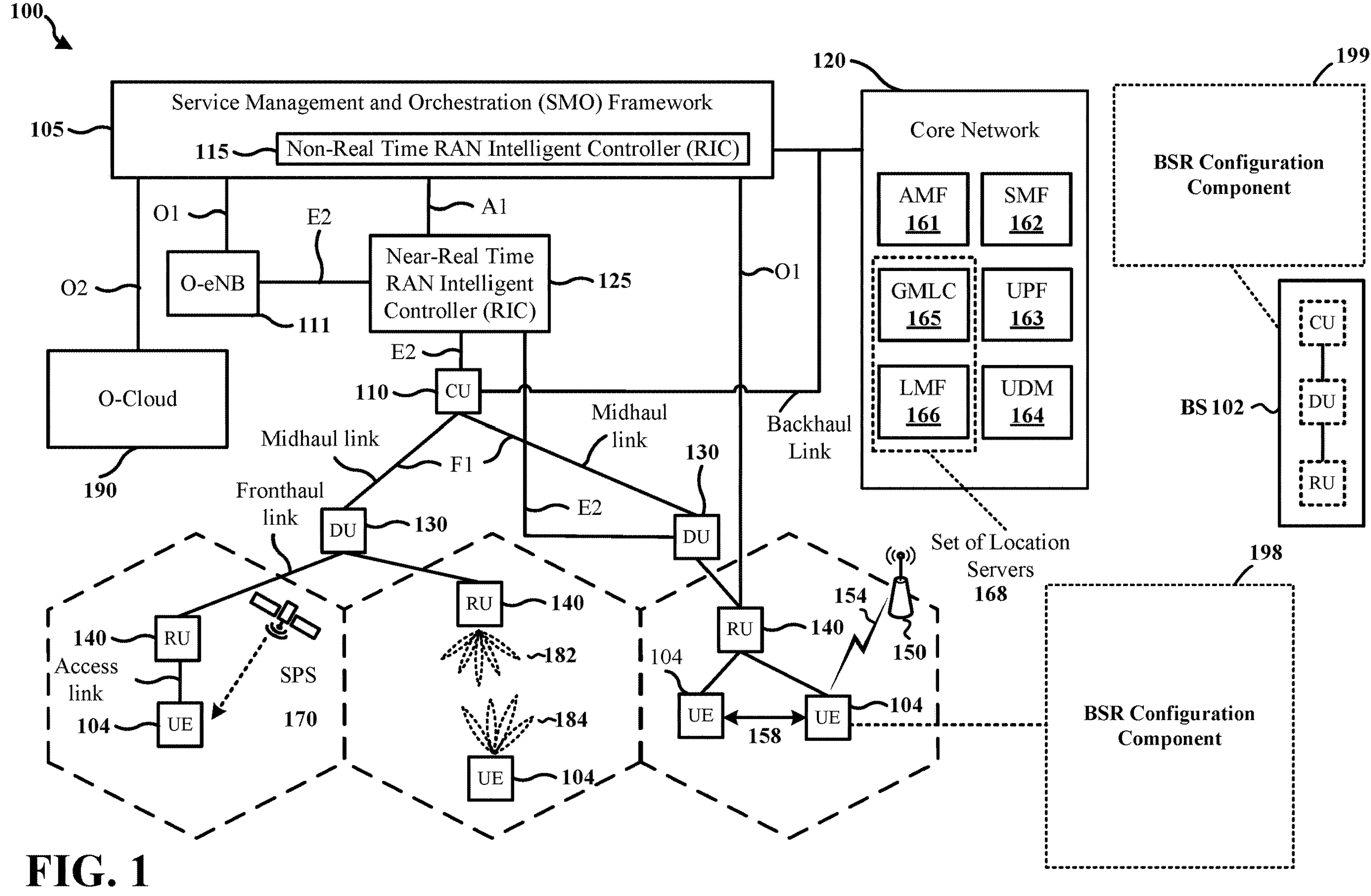
FIG. 1 is a diagram illustrating an example of a wireless communication system and an access network.

In wireless communication systems, such as Long-Term Evolution (LTE) and 5G systems, a buffer status report (BSR) provides the network with information about the data waiting to be transmitted from a user equipment (UE). The UE transmits a BSR that indicates the buffer status of the UE, which may facilitate the network to more efficiently allocate resources for wireless communication with the UE. A BSR table refers to a defined set of values that map the size of the data in the buffer to a specific index, which then may be sent to the network in the BSR. For example, the defined set of values may be defined in a wireless standard and may be referred to as "pre-defined," in some examples. The BSR table may reduce the communication overhead as, rather than sending the exact buffer size, the UE can send an index to indicate the buffer size relative to the BSR table. The current BSR configurations operate on a model with one BSR table for one medium access control (MAC) entity, and the one BSR table is used to indicate a buffer status for various logical channel groups (LCGs), radio bearers (e.g., data radio bearers (DRBs) or signaling radio bearers (SRBs)), protocol data unit (PDU) sessions, and application flows. Example aspects presented herein provide a solution with enhanced BSR configurations that are more adaptable to varied communication scenarios. The aspects presented herein may be used to provide improved BSR, e.g., in the context of extended reality (XR), among other types of traffic. The proposed enhancements to BSR configurations allow multiple BSR tables to be configured corresponding to diverse link characteristics, PDU sessions, and logical channels, thereby improving the accuracy of the BSR data and responsiveness of wireless communication. In some aspects, switches between BSR tables may be indicated in signaling such as a medium access control-control element (MAC-CE). In some aspects, the indication may be based on an activation/deactivation or enable/disable for a cell group (CG), a component carrier, or based on a throughput or grant pattern. In some aspects, the UE may receive a configuration for multiple BSR timers (e.g., a periodic BSR timer or scheduling request (SR) delay timer) that are LCG specific or Quality of Service (QoS) flow specific. In some aspects, the UE may indicate a BSR based on a BSR table that is specific to a particular protocol data unit (PDU) session, link, or subcarrier spacing (SCS).

Particular aspects of the subject matter described in this disclosure can be implemented to realize one or more of the following potential advantages. In some examples, by enabling a UE to obtain multiple BSR tables and one or more timers, the described techniques can be used to allow the UE to select BSR tables and timers according to the specific characteristics of the traffic. The method enables the uplink (UL) data transmission to be flexibly customized according to the operation requirements. Thus, it improves the efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) (e.g., one or more of a Global Navigation Satellite System (GNSS), global position system (GPS), non-terrestrial network (NTN) 170, or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a BSR configuration component 198. The BSR configuration component 198 may be configured to obtain multiple BSR tables and multiple sets of one or more timers (e.g., several timers), where each BSR table of the multiple BSR tables corresponds to one LCG of multiple LCGs; and communicate with a network entity based on one BSR table selected from the multiple BSR tables and one set of timers selected from the multiple sets of one or more timers. In certain aspects, the base station 102 may include a BSR configuration component 199. The BSR configuration component 199 may be configured to provide to a UE, an indication for the UE to select one BSR table from multiple BSR tables and select one set of one or more timers from multiple sets of one or more timers, where each BSR table of the multiple BSR tables corresponds to one LCG of multiple LCGs; and communicate with the UE based on the one BSR table and the one set of one or more timers indicated for the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
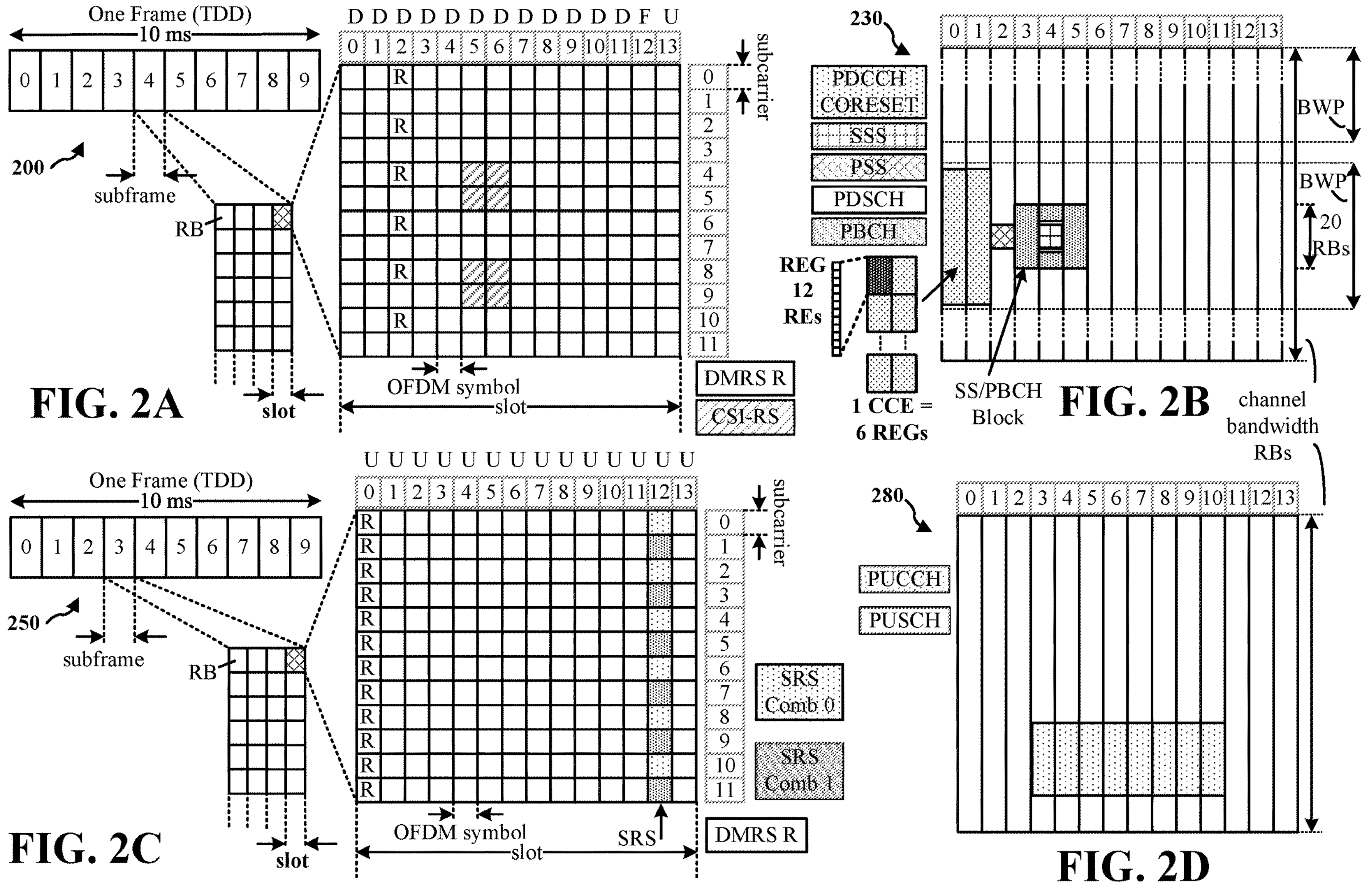
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (also referred to as physical resource blocks (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of a resource block. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of resource blocks in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
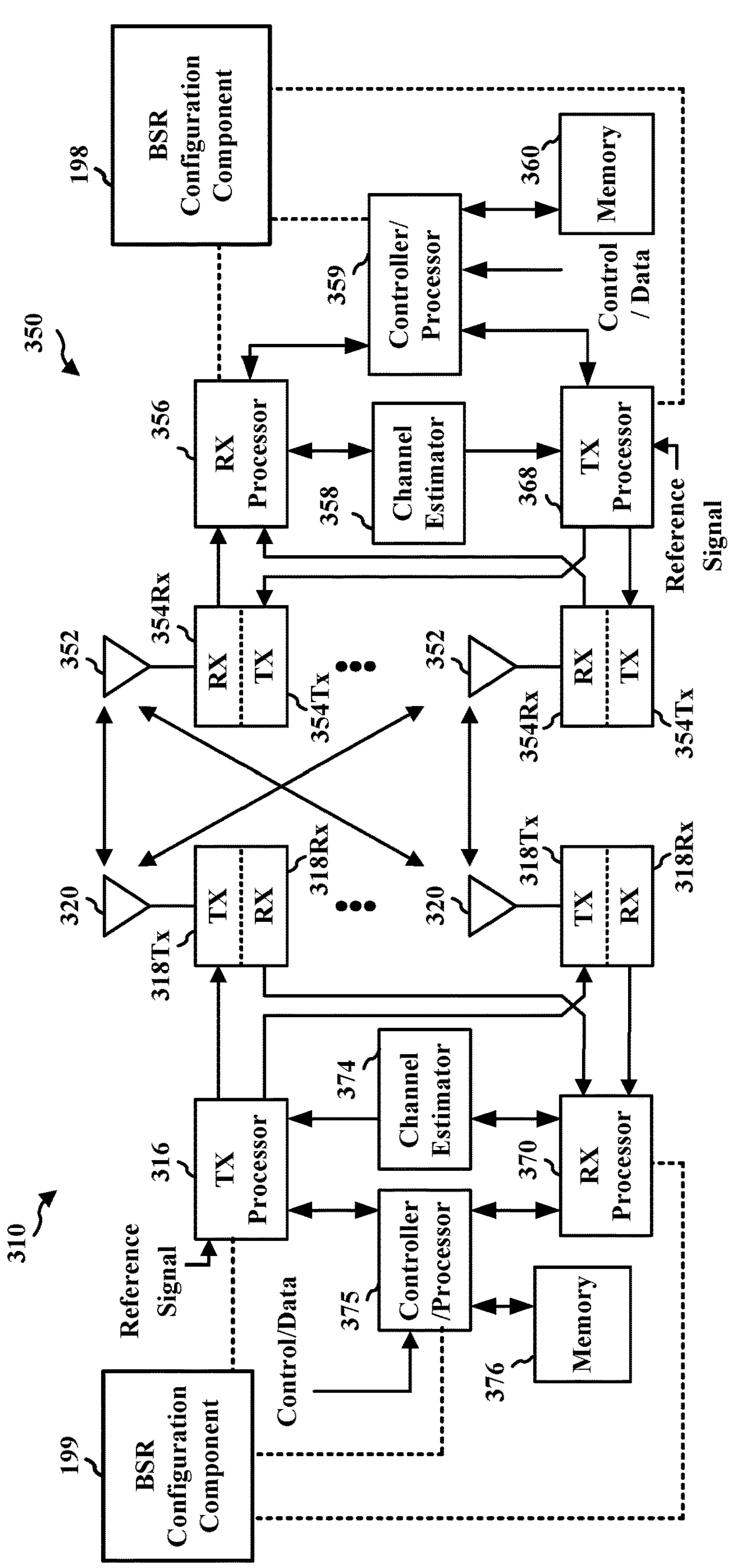
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the BSR Configuration component 198 of FIG. 1.

At least one of the TX processor 316, the RX processor 370, and the controller/processor 375 may be configured to perform aspects in connection with the BSR Configuration component 199 of FIG. 1.

A UE may have uplink data to transmit to a network. The UE may transmit a BSR, e.g., in a MAC-CE from the UE to the network, with information regarding the amount of data in the UE's buffer waiting to be sent, e.g., transmitted, to the network. By sending a BSR to a network, the UE requests, or informs, the network to provide a UL grant (e.g., allocating or granting a transmission resource to the UE), through which the UE may transmit the data to the network. Upon receiving a BSR from the UE, the network may allocate a corresponding amount of resources in a UL grant (e.g., scheduling a transmission resource) for the UE to use for a UL transmission, the amount of resources being based on the amount of data that the BSR indicated.

Figures 4A, 4B, 4C:
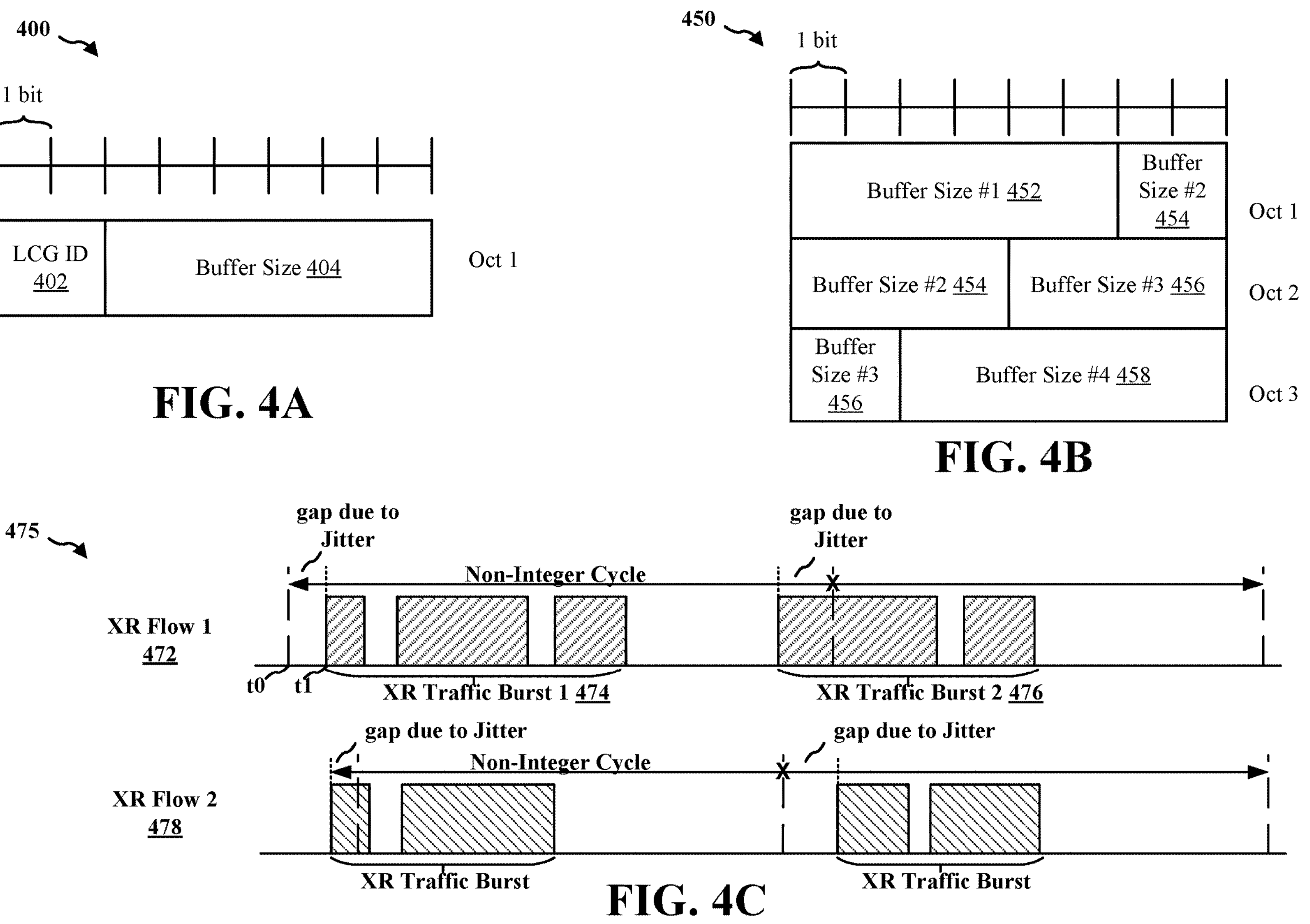
FIGS. 4A and 4B are diagrams illustrating example data structures of buffer status reporting (BSR) and medium access control (MAC)-control element (MAC-CE).
FIG. 4C illustrates an example of extended reality (XR) traffic flows.

A BSR may have different data structures and transmission timing. For example, a BSR may be a long BSR or a short BSR, depending on its data structure. A short BSR may indicate the amount of data in the UE's buffer for a single LCG, while a long BSR may indicate the amount of data in the UE's buffer for multiple LCGs. As used herein, a logical channel group, or LCG, may refer to a set of logical channels that are categorized based on their function or purpose. FIG. 4A is a diagram 400 illustrating an example data structure of a short BSR MAC-CE. As shown in FIG. 4A, a short BSR may include an LCG ID 402 of the single LCG and a Buffer Size 404. The LCG ID 402 may be 2 bits, for example, and the Buffer Size 404 may include 6 bits, as an example. The Buffer Size 404 may indicate the amount of data for the LCG indicated by the LCD ID 402. FIG. 4B is a diagram 450 illustrating an example data structure of a long BSR MAC-CE. As shown in FIG. 4B, a long BSR may include multiple Buffer Size fields, such as Buffer Size #1 452, Buffer Size #2 454, Buffer Size #3 456, and Buffer Size #4 458. Each of these Buffer Size fields may include 6 bits, as an example, and indicate the amount of data for one LCG, and different Buffer Sizes may indicate the amount of data for different LCGs.

A BSR may be an aperiodic BSR or a periodic BSR based on the timing at which the BSR is sent to the network. A UE may transmit an aperiodic BSR, which may be referred to as a regular BSR in some aspects, in response to the arrival of new data in the UE's buffer, and based on the new data having a higher priority than the data already waiting in the UE's buffer. The UE may transmit a periodic BSR according to a preset periodicity, e.g., a periodicity that may be configured by the network for BSR transmission.

In a BSR configuration, a single BSR table may correspond to a MAC entity, and BSRs for the MAC entity may be based on the single BSR table. The single BSR table may be used for each of the LCGs, RBs (which may include DRBs or SRBs), PDU sessions, and various application flows for a MAC entity. For example, the BSR table may be associated with a given MAC entity irrespective of the particular transmission scenarios, such as the number of active CCs, the bandwidth (BW) per CC. In some aspects, the BSR table may be indicated based on the manner in which the BW or CCs are and how they are enabled/disabled through either the MAC-CE mechanism or RRC configuration based mechanism. The single BSR table does not enable BSR reporting differentiation between one PDU session or multiple PDU sessions. The use of a single BSR table does not provide for differentiation between PDU session bearers that are mapped to different services using UE Route Selection Policy (URSP) rules or advanced QoS requirements with the network's functionality (e.g., slicing approach) or carrying different types of traffic. Additionally, the single BSR table may not enable differentiation between BSR information between MAC entities on different frequency bands (e.g., FR1 or FR2) or for links based on different modes of operation (e.g., terrestrial network (TN) or Non-Terrestrial Network (NTN) mode of operation), or where the NTN connection is operating on different mechanisms, such as High-Altitude Platform Station (HAPS), Low Earth Orbit (LEO)/Medium Earth Orbit (MEO)/Geostationary Earth Orbit (GEO). In some aspects, a UE may receive an RRC configuration for BSR that configures different timers related to BSR at the MAC entity level. However, these timers may apply to each logical channel or logical channel group. Aspects presented herein provide for BSR timers which may be logical channel (LC) specific, LCG-specific, or flow-specific, which allows for BSR transmissions to be handled differently for different LCs, LCGs, or flows.

Figure 5:
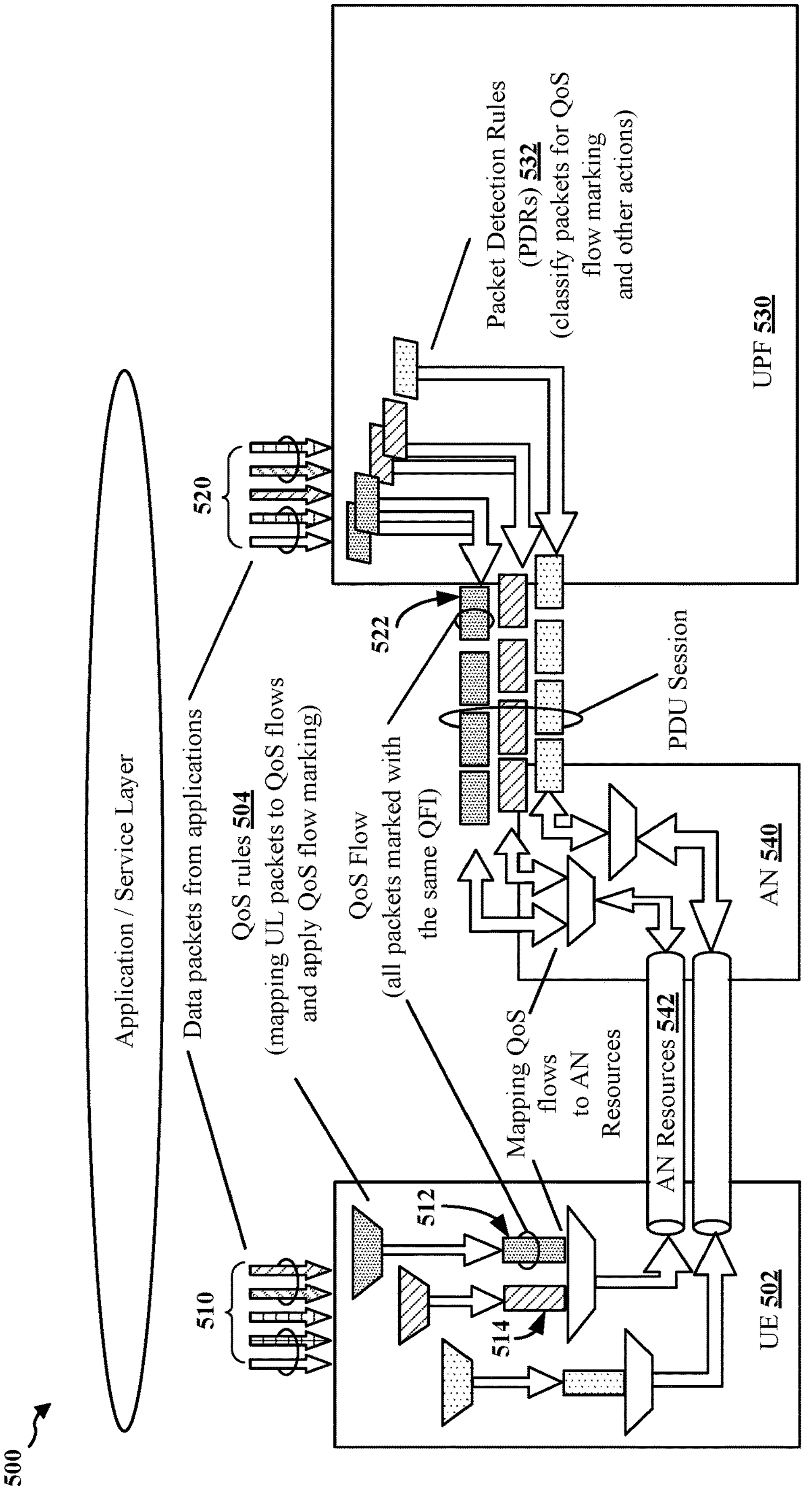
FIG. 5 is a diagram illustrating example mappings of quality of service (QoS) flows across the bears.

FIG. 5 is a diagram 500 illustrating an example mapping of QoS flows across the bearers. As shown in FIG. 5, various QoS flows may be mapped based on different QoS requirements across the radio bearers. For example, in downlink (DL), incoming data packets 520 may be classified by the user plane function (UPF) 530 based on the packet detection rules (PDRs) 532, which is a set of criteria or algorithms used to identify the beginning and end of data packets (e.g., data packets 520) transmitted over a wireless network. The access network (AN) 540 may bind QoS flows (e.g., QoS flow 522) to AN resources (e.g., AN resources 542). The AN resources may include, for example, data radio bearers. Similarly, in uplink (UL), the UE 502 may classify UL packets (e.g., packets 510) based on the QoS rules 504, and bind the QoS flows (e.g., QoS flows 512, 514) to the AN resources (e.g., AN resources 542). In some examples, distinguishing between the bearers that are part of a single slice (e.g., a segment of a wireless network operating independently to meet specific service or performance requirements) or different slices may facilitate the support for End-to-End (E2E) resource management to meet the service level agreements (SLA).

Figure 6:
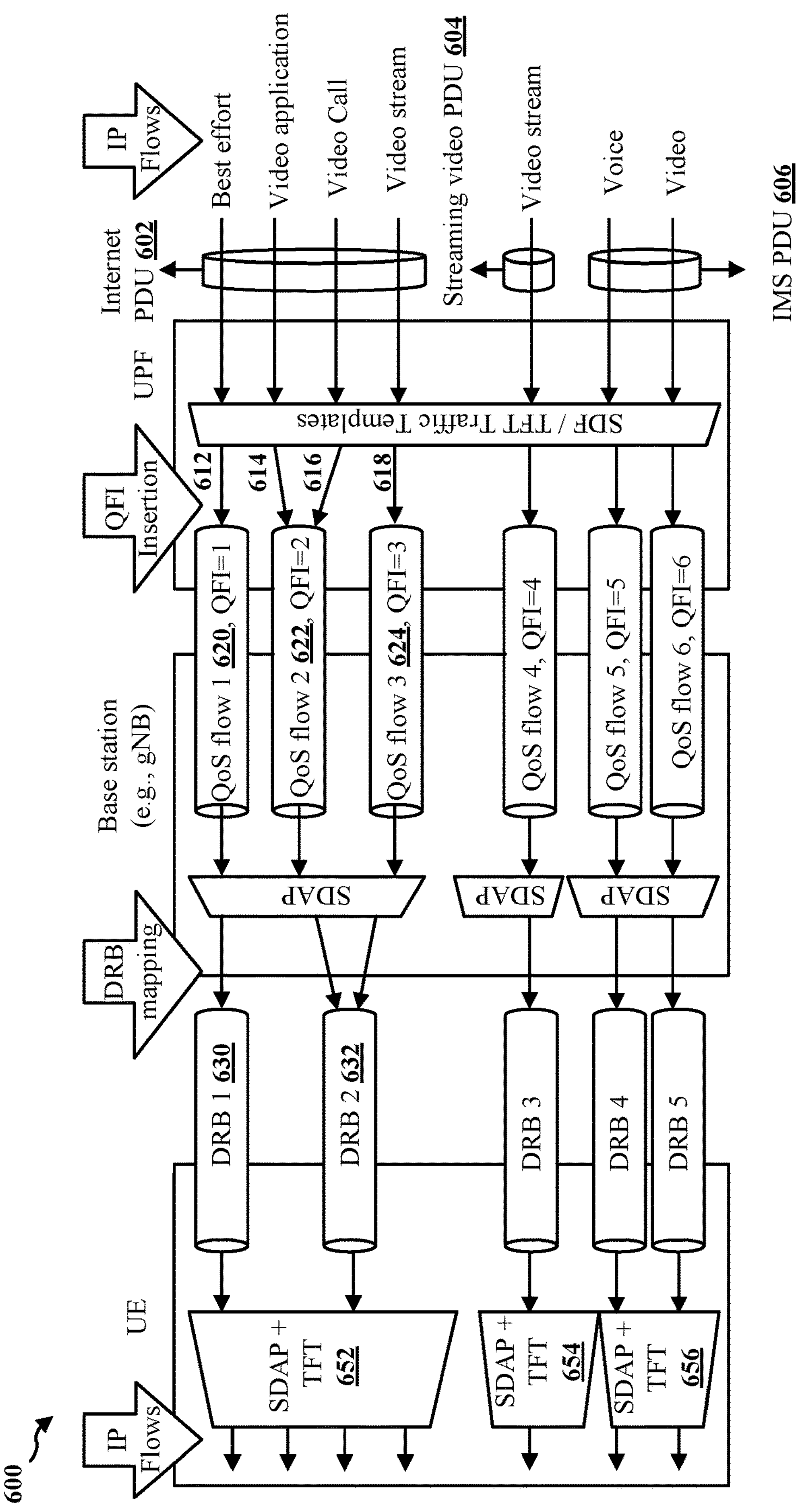
FIG. 6 is a diagram illustrating example mappings among different flows, Radio Bearers (RBs), Service Data Adaption Protocols (SDAPs), and protocol data unit (PDU) sessions.

FIG. 6 is a diagram 600 illustrating an example mapping among different flows, DRBs, SDAPs, and PDU sessions. In FIG. 6, different PDU sessions, such as Internet PDU session 602, streaming video PDU session 604, or IP multimedia subsystem (IMS) PDU session 606, may have different QoS requirements. Each PDU session may get its own service data flows (SDFs). For example, Internet PDU session 602 may have four SDFs (e.g., SDFs 612, 614, 616, and 618). One or multiple SDFs can be mapped to the same QoS flow. For example, SDFs 614 and 616 may be mapped to QoS flow 2 622, and SDF 618 may be mapped to QoS flow 3 624. The QoS flows may be mapped to data radio bearers (DRBs), and one or multiple QoS flows may be mapped to one DRB. For example, as shown in FIG. 6, QoS flow 1 620 may be mapped to DRB 1 630, and QoS flow 2 622 and QoS flow 3 624 may be mapped to the same DRB (DRB 2 632). As shown in FIG. 6, multiple DRBs (such as a default DRB and optional dedicated DRBs) may be mapped on the same PDU session. For example, DRB 1 630 and DRB 2 632 may be mapped to the Internet PDU session 602. One SDAP entity may correspond to one PDU session. For example, the SDAP entity 652 may correspond to the Internet PDU session 602, the SDAP entity 654 may correspond to the streaming video PDU session 604, and the SDAP entity 656 may correspond to the IMS PDU session 606.

A wireless communication system may support various types of traffic. Among other types of traffic, a wireless communication system may support XR traffic. XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE, or the XR traffic may be transmitted by a UE and received by a base station.

XR traffic may arrive in periodic traffic bursts ("XR traffic bursts"). An XR traffic burst may vary in a number of packets per burst and/or a size of each pack in the burst. The diagram 475 in FIG. 4C illustrates a first XR flow 472 that includes a first XR traffic burst 474 and a second XR traffic burst 476. As illustrated in the diagram 475, the traffic bursts may include different numbers of packets, e.g., the first XR traffic burst 474 is shown with three packets (represented as rectangles in the diagram 475) and the second XR traffic burst 476 is shown with two packets. Furthermore, as illustrated in the diagram 475, the three packets in the first XR traffic burst 474 and the two packets in the second XR traffic burst 476 may vary in size, that is, packets within the first XR traffic burst 474 and the second XR traffic burst 476 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in $1/60$=16.67 ms periods. In another example, for 120 FPS video data, XR traffic bursts may arrive in $1/120$=8.33 ms periods.

Arrival times of XR traffic may vary. For example, XR traffic bursts may arrive and be available for transmission at a time that is earlier or later than the time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 472, a UE may expect a first packet of the first XR traffic burst 474 to arrive at time t0, but the first packet of the first XR traffic burst 474 arrives at time t1.

XR traffic may include multiple flows that arrive at a UE (or a base station) concurrently with one another (or within a threshold period of time). For instance, the diagram 475 includes a second XR flow 478. The second XR flow 478 may have different characteristics than the first XR flow 472. For instance, the second XR flow 478 may have XR traffic bursts with different numbers of packets, different sizes of packets, etc. In an example, the first XR flow 472 may include video data and the second XR flow 478 may include audio data for the video data. In another example, the first XR flow 472 may include intra-coded picture frames (I-frames) that include complete images and the second XR flow 478 may include predicted picture frames (P-frames) that include changes from a previous image.

The present disclosure provides methods and apparatus for BSR configuration enhancements. In some aspects, multiple BSR tables may be provided for a UE, e.g., by one or more additional BSR table(s) being introduced. In some examples, additional BSR tables may be introduced for XR-specific applications. These BSR tables may be configured statically or dynamically based on, for example, RRC parameters signaled by the network. For example, multiple BSR tables may be defined, e.g., in a wireless standard and known by a base station and a UE. In other examples, a base station may provide a UE with a configuration of the multiple BSR tables. For example, a base station may provide the UE with an RRC configuration or multiple BSR tables with different characteristics. In one aspect, each of the BSR tables may be associated with an LCG group. For example, the BSR tables may be mapped to the LCG groups according to a [$LCG_x$, $BSRTable_x$] model, where $BSRTable_x$ refers to a BSR table associated with the $LCG_x$. A default table may be provided (e.g., defined and/or configured) for non-specific LCGs, e.g., LCGs that do not have a mapping to a particular BSR table. In another example, each of the BSR tables may be associated with a specific flow (e.g., a QoS flow). In some examples, different BSR tables may be provided for different DRBs, and BSRs for each of the LCs in one LCG may use the same BSR table. The UE may then use a particular BSR table of the multiple BSR tables to report a BSR to the network based on the LCG group, the flow, and/or the DRBs for which the BSR is to be reported.

In some aspects, the methods for BSR configuration enhancements may include a MAC-CE based switching mechanism that provides an indication for the UE to select between different BSR tables (or the default BSR table). The indication may be based on a cell group (CG) or CC being enabled or disabled (or having an activated/deactivated status), which may change the UL RB mapping (e.g., secondary cell group (SCG) to primary cell group (MCG) or duplicated disablement) and throughput/grant pattern dynamically. In some aspects, an MCG may be referred to as a master cell group. As an example, if the UE receives a MAC-CE activating a first CG, the UE may use a first BSR table. If the UE then receives a MAC-CE activating a second CG and/or deactivating the first CG, the UE may use a second BSR table. Similarly, the UE may switch between BSR tables in response to a MAC-CE that activates or deactivates a CC. The UE may then use the selected (or indicated) BSR table for providing a BSR to the network.

In some aspects, the methods for BSR configuration enhancements may include additional retransmission (ReTx) BSR timers and other timer mechanisms, such as the periodic BSR timers and the SR delay timers that allow for different BSR operations for different LCGs or flows. For example, the UE may receive a configuration for BSR timers that are LCG specific. As an example, LCG specific BSR timers allow the UE to send a BSR retransmission for a higher priority LCG more quickly than a BSR retransmission for a lower priority LCG. As another example, the timers may be flow-specific so that the UE may send a BSR retransmission for a higher priority flow (e.g., flow associated with a video call or other Over-the-Top (OTT) applications) more quickly than a BSR retransmission for a lower priority flow.

In some aspects, the BSR tables may be PDU session-specific, link-specific, or SCS-specific. For example, different PDU sessions (e.g., internet PDU session and on-demand PDU session) may have different URSP rules or support for slicing BW, different links (e.g., the links associated with the TN or NTN connections) may have different latencies and associated paths, and different SCS (e.g., FR1 and FR2) may have different latencies and coverage/loading issues. The corresponding BSR table for particular PDU sessions, links, or SCS may allow the UE to provide more accurate information to the network than a single BSR table that covers all the PDU sessions, links, and SCS. The UE may select a BSR table and/or timer from multiple BSR tables and/or timers based on the PDU session, link, and/or SCS. The UE may then use the selected BSR table to report BSR to the network.

In some aspects, the UE may switch between BSR tables (or to a default BSR table) based on MAC-CE, as described above. For example, the switch between BSR tables may be triggered based on a MAC-CE that enables/disables or activates/deactivates a CG or CC, which may change the UL RB mapping (e.g., SCG to MCG or Duplicated disablement) and throughput/grant pattern dynamically. For example, a UE may receive a configuration, e.g., in RRC signaling, for multiple cell groups, and one or more of the configured cell groups may be activated or enabled for use by the UE through activation signaling in a MAC-CE. Similarly, multiple CCs may be configured for the UE, and one or more of the configured CCs may be activated or enabled for the UE in a MAC-CE. The UE may select a BSR table from a set of multiple BSR tables based on the status of one or more CGs and/or CCs.

As the SCG may be enabled or disabled for the UE through a MAC-CE transmitted to the UE by the network, the total latency and link characteristics may change (e.g., if the SCG is in FR2, and the MCG is in FR1 or if the SCG and the MCG have different SCS, etc.), and the BSR table configuration may be changed dynamically, e.g., used by the UE, based on whether the data traffic is going through MCG alone, SCG, or SCG Split.

For example, when the traffic goes through the MCG, a different BSR table may be used by the UE to report BSR to the network (compared with the BSR table in an SCG-enabled case). As the number of CCs that are enabled/disabled for the UE within a Carrier Group changes based on the MAC-CE approach, the effective BW availability may change, and the UE may use a different BSR table configuration in response, e.g., dynamically, to the associated latency requirement. Additionally, the MAC-CE based duplication enablement/disablement may change the traffic pattern, and the UE may use a different BSR table according to the changed duplication enablement/disablement.

In some aspects of the present disclosure, a UE may use BSR-specific timers. The BSR-specific timers may include any of a ReTx BSR timer, a periodic BSR timer, or an SR delay timer. In some aspects, the BSR-specific timers may be LCG-specific so that a higher-priority LCG might result in a quicker BSR re-transmission compared to a lower priority LCG. For example, among two LCGs with different priorities (e.g., a first LCG that has a higher priority than a second LCG), each of the two LCGs may have its own ReTx BSR timer, and the ReTx BSR timer for the higher-priority LCG (e.g., the first LCG) may be shorter than that for the lower-priority LCG (e.g., the second LCG).

As an LCG may include multiple LCs and one UE may be associated with different LCGs based on the priority logic, different timers to expire with lower or higher values may help to enable differential behaviors based on the traffic characteristics. For example, a first DRB (or LC, LCG) may have default internet traffic (background (BG) traffic), while a second DRB (or LC, LCG) may have Voice over 5G New Radio (VoNR) traffic. As VoNR may be latency sensitive, a smaller ReTx BSR timer associated with the second DRB (or LC, LCG) than the first DRB (or LC, LCG) may help to send a quicker BSR request for grant management for the VoNR traffic compared to the internet traffic (BG traffic).

In some aspects, the BSR specific timers may be flow-specific so that a higher priority flow might result in a quicker BSR re-transmission compared to a lower priority flow. For example, some applications (e.g., a video call or other OTT applications) may be assigned a higher priority than other applications, and the BSR timers corresponding to the higher-priority applications may be shorter than the BSR timers for other applications. When a higher-priority application (e.g., a video call/OTT) flow is present along with other internet BG traffic flows mapped on to default DRB, the shorter BSR timers associated with these applications may help to inform the network quickly to ensure a video call or OTT traffic gets better latency than for BG traffic.

Another aspect of the present disclosure provides BSR tables that are PDU session specific, e.g., associated with a particular PDU session. Different types of traffic may have different PDU sessions, such as default PDU session and on-demand PDU session. Each PDU session may be associated with one traffic type. A network may provide an option to have different PDU sessions based on traffic types, such as Internet Protocol version 4 (IPv4), Internet Protocol version 6 (IPv6), IPv4 & IPv6 (IPv4v6), Ethernet (ETH) traffic, or unstructured traffic. The use of multiple BSR tables for different traffic types, e.g., a BSR table corresponding to one PDU session enables improved BSR reporting. For example, the default internet traffic (IPV4) may be going through PDU session 1, and the ETH traffic may be going through PDU session 2. These two PDU sessions may have different service requirements across the applications, and using a single BSR table to cover these two PDU sessions may not serve either of these two PDU sessions well. As presented herein, two BSR tables may be provided, one corresponding to PDU session 1 (for IPv4 traffic) and the other one corresponding to PDU session 2 (for ETH traffic), which enables more targeted BSR reporting for the corresponding type of traffic.

Additionally, different PDU sessions may have different URSP rules or slicing BW support (e.g., slicing type and slicing instance for extended service level agreement (SLA)). The network may provide an option to have enhanced Mobile Broadband (eMBB)/ultra-reliable low latency communications (URLLC)/Massive Machine-Type Communications (mMTC) as different kinds of slice types and also creates various instances of slices with slice ID (e.g., via the Single-Network Slice Selection Assistance Information (S-NSSAI] mechanism). Also, different slices may provide different QoS provisions at the E2E service level between applications to a core network reserving the resources across the entities. In these cases, multiple BSR tables, each corresponding to one PDU session, may be provided. For example, different BSR tables may be provided based on the characteristics of the PDU sessions. These characteristics may include serving targets of the PDU sessions, QoS requirements of the PDU sessions, traffic type characteristics of the PDU sessions, slicing requirements and URSP rules associated with the PDU sessions, and the slicing instance and/or the slice type associated with the PDU sessions.

Another aspect of the present disclosure is directed to BSR tables that are link-specific or SCS-specific. Different types of links, such as the TN connection and the NTN connection, may have different latencies and different associated paths. For example, the TN network may have a lesser latency or round-trip time (RTT) than the NTN network (although some kinds of HAPS may have comparable latency). Timing Advance (TA) logic and some other advanced mechanisms may be needed to compensate for the NTN aspects. Having different BSR tables based on the link characteristics may help because of the fine granularity and code point variations for different links. For example, different BSR tables may be provided based on the characteristics of the link. These characteristics may include the connection type of the link, such as whether the link is for a TN connection or an NTN connection. As an example, an NTN connection may include a satellite or other aerial network device in the communication path. As an example, FIG. 1 illustrates an example of an NTN 170 device. Additionally, if the connection type of the link is the NTN connection, the characteristics of the link may further include the latency associated with the NTN connection; the link capacity associated with the NTN connection; and additional NTN connection characteristics, which may include: complete base stations associated with the NTN connection, reflectors or relays associated with the NTN connection, or a core network associated with the NTN connection.

In some aspects, the BSR tables may be SCS-specific. For example, different frequency bands, such as FR1 and FR2, may have different latencies and coverage/loading issues. For example, FR1 cells are typically designed for more coverage and non-peak rate purposes, while FR2 cells are designed for more capacity and peak rate purposes. Additionally, FR2 cells may have a higher BW and better SNR characteristics with limited coverage and reduced UE loading compared to the FR1 counterparts. Hence, having different BSR tables based on the SCS aspects and associated functionality may help to differentiate the service capability. For example, different BSR tables may be provided based on the SCS characteristics of the connection. These characteristics may include the frequency band for the connection. The frequency band may be one of the FR1 frequency band, the FR2 frequency band, or the FR2+ frequency band.

Figure 7:
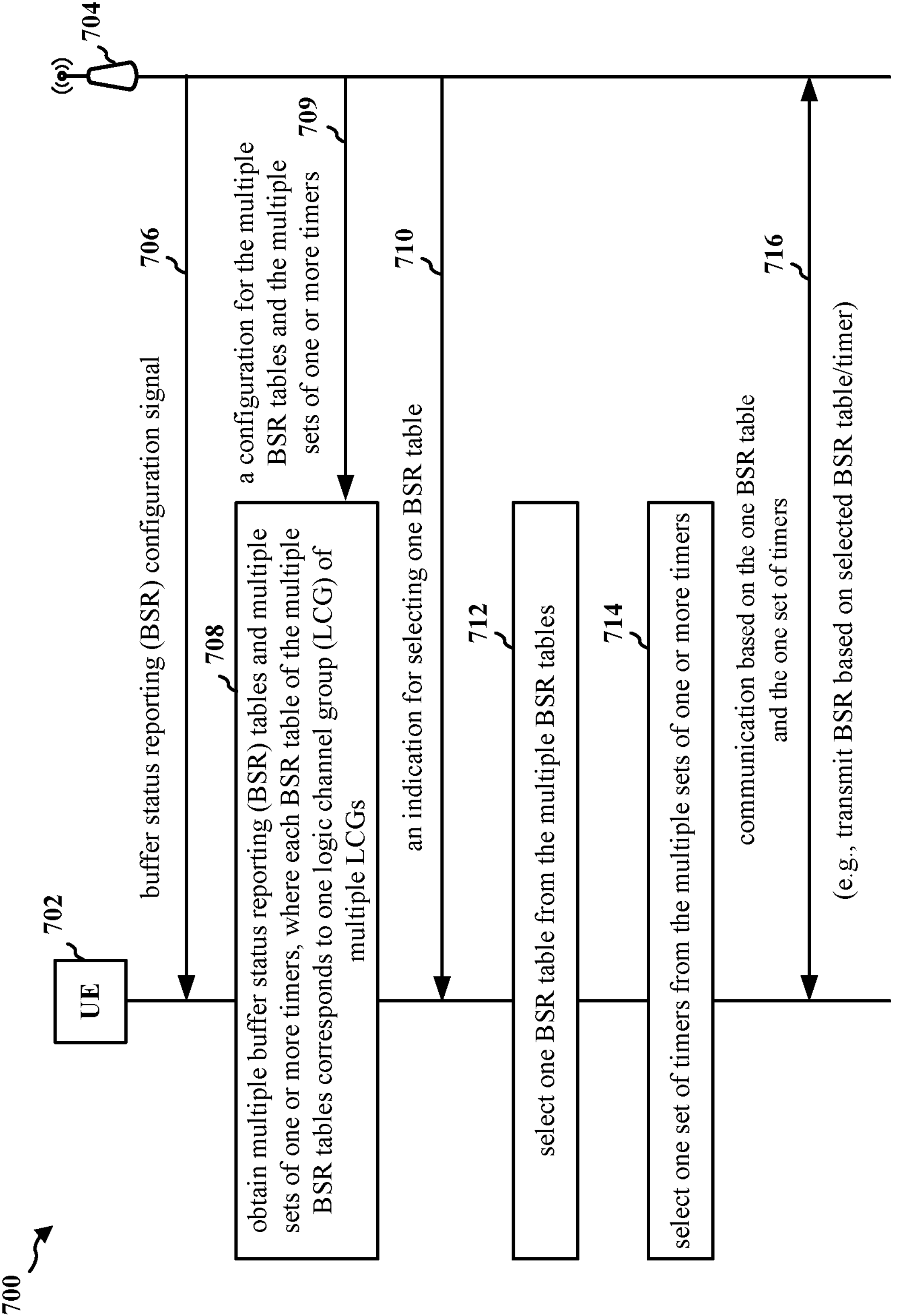
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Although aspects are described for a base station 704, the aspects may be performed by a base station in aggregation and/or by one or more components of a base station 704 (e.g., a CU 110, a DU 130, and/or an RU 140).

As shown in FIG. 7, at 706, a UE 702 may receive a BSR configuration signal from a base station 704. The BSR configuration signal may specify multiple BSR tables and multiple sets of one or more timers for the UE. Each of the multiple BSR tables may be specific to various characteristics of the communication between the UE 702 and the base station 704. For example, each of the multiple BSR tables may be specific to one or more of the LCG, the flow, the PDU session, the link, and the SCS. Each of the one or more timers may be specific to one or more of the LCG and the flow.

At 708, the UE 702 may obtain multiple BSR tables (e.g., either defined or received in a configuration at, for example, 709) and multiple sets of one or more timers. Each BSR table of the multiple BSR tables may correspond to one LCG of multiple LCGs. For example, the UE 702 may obtain the multiple BSR tables and multiple sets of one or more timers based on the BSR configuration signal received from the base station 704, at 706. In some examples, the multiple BSR tables may be configured according to multiple PDU sessions. For example, referring to FIG. 6, the UE may receive a configuration for three BSR tables corresponding to the three PDU sessions (e.g., Internet PDU, streaming video PDU, and IMS PDU), respectively.

At 709, the UE 702 may receive a configuration for the multiple BSR tables and the multiple sets of one or more timers.

At 710, the UE 702 may receive an indication for selecting one BSR table from the base station 704. The indication may be received through MAC-CE or RRC information.

At 712, the UE 702 may select one BSR table from the multiple BSR tables. For example, the one BSR table may be selected based on the characteristics of the communication between the UE 702 and the base station 704. For example, referring to FIG. 6, the UE may obtain three BSR tables corresponding to the three PDU sessions (e.g., Internet PDU, streaming video PDU, and IMS PDU), and the UE may select the BSR table corresponding to Internet PDU session for data associated with the Internet PDU session.

At 714, the UE 702 may select one set of timers from multiple sets of one or more timers. For example, the one set of timers may be selected based on the characteristics of the communication between the UE 702 and the base station 704. For example, referring to FIG. 6, each of the one or more timers may be associated with one DRB of the multiple DRBs.

At 716, the UE 702 may communicate with the base station 704 based on the one BSR table and the one set of timers configured for the UE. For example, referring to FIG. 6, when the UE 702 and the base station 704 communicate the data associated with one specific application (e.g., video stream), the UE 702 may communicate with the base station 704 based on the corresponding BSR table (e.g., the BSR table corresponding to Internet PDU session) and the corresponding timers (e.g., the timers corresponding to DRB 2). As an example, the UE may transmit a BSR to the network using the selected BSR table and/or timer.

Figure 8:
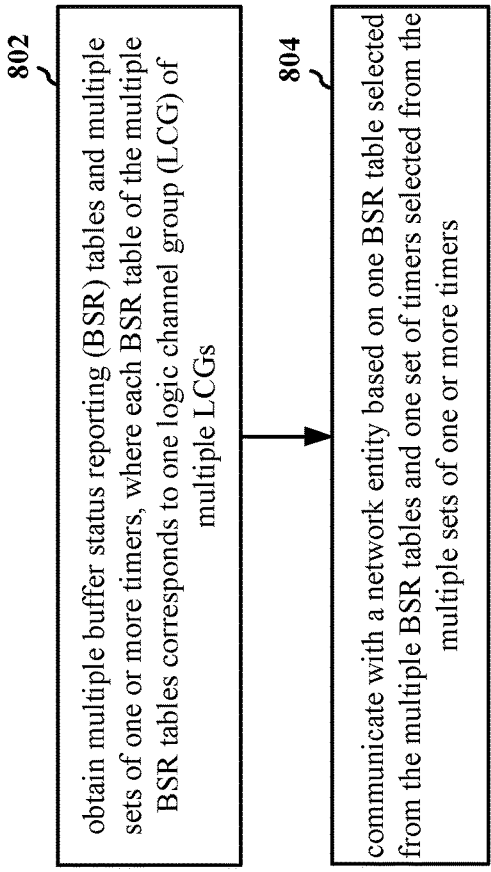
FIG. 8 is a flowchart illustrating methods of wireless communication at a UE in accordance with various aspects of the present disclosure.
Figure 8:

FIG. 8 is a flowchart 800 illustrating methods of wireless communication at a UE in accordance with various aspects of the present disclosure. The method may be performed by a UE. The UE may be the UE 104, 350, 702, or the apparatus 1204 in the hardware implementation of FIG. 12. The method enables the UE to obtain multiple BSR tables and BSR timers and select corresponding BSR table(s) and timers according to the specific characteristics of the traffic. The method enables the UL data transmission to be flexibly customized according to the operation requirements. Thus, it improves the efficiency of wireless communication.

As shown in FIG. 8, at 802, the UE may obtain multiple BSR tables and multiple sets of one or more timers. Each BSR table of the multiple BSR tables may correspond to one LCG of multiple LCGs. The BSRs may be received in a configuration from a network entity such as a base station, or a component of a base station, in the access network of FIG. 1 or a core network component (e.g., base station 102, 310, 704; or the network entity 1202 in the hardware implementation of FIG. 12). FIG. 7 illustrates various aspects of the steps in connection with flowchart 800. For example, referring to FIG. 7, the UE 702 may obtain, at 708, multiple BSR tables and multiple sets of one or more timers. Each BSR table of the multiple BSR tables may correspond to one LCG of multiple LCGs. In some aspects, 802 may be performed by the BSR configuration component 198.

At 804, the UE may communicate with the network entity based on the one BSR table selected from the multiple BSR tables and the one set of timers selected from the multiple sets of one or more timers. For example, referring to FIG. 7, the UE 702 may select, at 712, one BSR table from the multiple BSR tables, and select, at 714, one set of timers from the multiple set of one or more timers. The UE 702 may communicate, at 716, with the network entity based on the one BSR table and the one set of timers. For example, the UE may transmit a BSR based on the selected BSR table and/or timer. In some aspects, 804 may be performed by the BSR configuration component 198.

Figure 9:
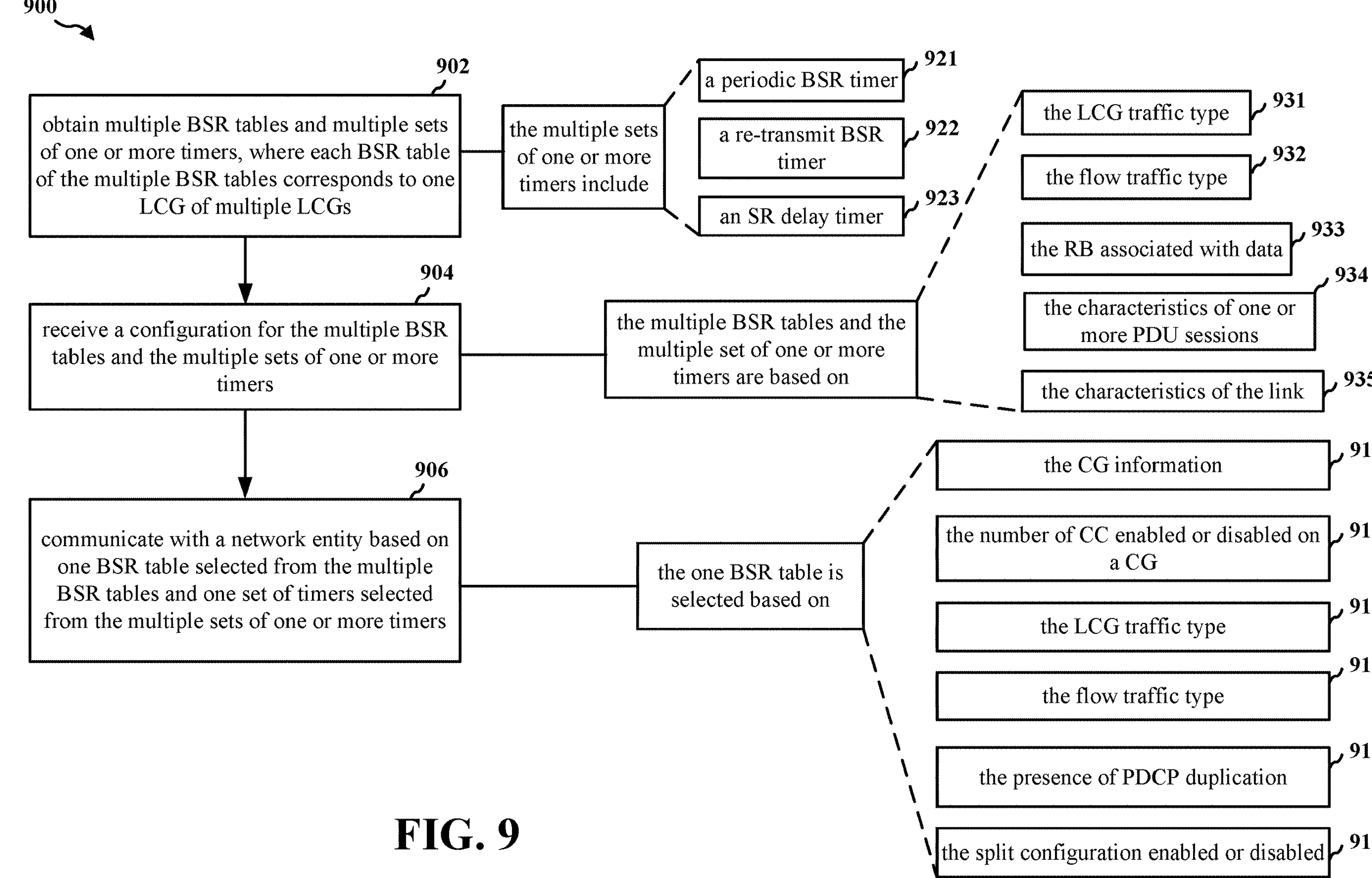
FIG. 9 is a further flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE. The UE may be the UE 104, 350, 702, or the apparatus 1204 in the hardware implementation of FIG. 12. The method enables the UE to obtain multiple BSR tables and BSR timers and select corresponding BSR tables and timers according to the specific characteristics of the traffic. The method enables the UL data transmission to be flexibly customized according to the operation requirements. Thus, it improves the efficiency of wireless communication.

As shown in FIG. 9, at 902, the UE may obtain multiple BSR tables and multiple sets of one or more timers. Each BSR table of the multiple BSR tables may correspond to one LCG of multiple LCGs. The BSRs may be received in a configuration from a network entity such as a base station, or a component of a base station, in the access network of FIG. 1 or a core network component (e.g., base station 102, 310, 704; or the network entity 1202 in the hardware implementation of FIG. 12). FIG. 7 illustrates various aspects of the steps in connection with flowchart 900. For example, referring to FIG. 7, the UE 702 may obtain, at 708, multiple BSR tables and multiple sets of one or more timers. Each BSR table of the multiple BSR tables may correspond to one LCG of multiple LCGs. In some aspects, 902 may be performed by the BSR configuration component 198.

At 906, the UE may communicate with the network entity based on the one BSR table selected from the multiple BSR tables and the one set of timers selected from the multiple sets of one or more timers. For example, referring to FIG. 7, the UE 702 may select, at 712, one BSR table from the multiple BSR tables, and select, at 714, one set of timers from the multiple set of one or more timers. The UE 702 may communicate, at 716, with the network entity based on the one BSR table and the one set of timers. For example, the UE may transmit a BSR based on the selected BSR table and/or timer. In some aspects, 906 may be performed by the BSR configuration component 198.

In some aspects, the selection of the one BSR table may be based on an indication received through MAC-CE or RRC information. For example, referring to FIG. 7, the UE 702 may receive, at 710, an indication from the base station 704. The indication may be received through MAC-CE or RRC information, and the UE 702 may select one BSR table, at 712, based on the indication.

In some aspects, the selection of the one BSR table may be based on one or more of: CG information (911); the number of CC enabled or disabled on a CG (912); the LCG traffic type (913); the flow traffic type (914); the presence of PDCP duplication (915); or the split configuration enabled or disabled (916). The LCG traffic type (913) may refer to the type of traffic within an LCG. For example, an LCG traffic type (913) may include voice traffic, video traffic, data traffic, etc. The flow traffic type (914) may refer to refers to the type of traffic based on the characteristics of the flows. For example, a flow traffic type (914) may include real-time traffic, streaming traffic, etc. For example, referring to FIG. 7, when the UE 702 selects one BSR table at 712, the one BSR table may be selected based on one or more of: CG information; the number of CC enabled or disabled on a CG; an LCG traffic type; a flow traffic type; the presence of PDCP duplication; or a split configuration enabled or disabled.

In some aspects, the selection of the one BSR table may be based on the CG information (911) that includes one or more of: use of an MCG, use of an SCG, or use of a dual-connectivity (DC) mechanism. For example, referring to FIG. 7, when the UE 702 selects one BSR table at 712, the one BSR table may be selected based on the CG information that includes one or more of: use of an MCG, use of an SCG, or use of a DC mechanism.

In some aspects, the multiple sets of one or more timers may include one or more of: a periodic BSR timer (921), a re-transmit BSR timer (922), or an SR delay timer (923). For example, referring to FIG. 7, when the UE 702 obtains multiple sets of one or more timers at 708, the multiple sets of one or more timers may include one or more of: a periodic BSR timer, a re-transmit BSR timer, or an SR delay timer.

In some aspects, at 904, the UE may receive a configuration for the multiple BSR tables and the multiple sets of one or more timers. The configuration may be based on one or more of: the LCG traffic type (931); the flow traffic type (932); or the DRB associated with data (933). For example, referring to FIG. 7, when the UE 702 obtains multiple BSR tables and multiple sets of one or more timers at 708, the UE 702 may receive at 709 the configuration for the multiple BSR tables and the multiple sets of one or more timers. The configuration may be based on one or more of: an LCG traffic type; a flow traffic type; or a DRB associated with data. For example, referring to FIG. 6, the UE may obtain one timer for each of the DRBs (e.g., DRB 1, DRB 2, . . . , DRB 5). In some aspects, 904 may be performed by the BSR configuration component 198.

In some aspects, at 904, the UE may receive a configuration for the multiple BSR tables and the multiple sets of one or more timers. The configuration may be based on the characteristics of multiple PDU sessions (934). For example, referring to FIG. 7, when the UE 702 obtains, at 708, multiple BSR tables and multiple sets of one or more timers, the UE 702 may receive a configuration for the multiple BSR tables and the multiple sets of one or more timers based on the characteristics of multiple PDU sessions. For example, referring to FIG. 6, the UE may obtain one BSR table for each of the PDU sessions (e.g., the Internet PDU, the streaming video PDU, and the IMS PDU).

In some aspects, the characteristics of the multiple PDU sessions on which the multiple BSR tables and the multiple sets of one or more timers are based may include at least one of: serving targets of the multiple PDU sessions; QoS requirements of the multiple PDU sessions; traffic type characteristics of the multiple PDU sessions; slicing requirements and URSP rules associated with the multiple PDU sessions; or at least one of a slice instance or a slice type associated with the multiple PDU sessions. For example, referring to FIG. 6, the UE may obtain BSR tables according to serving targets of the multiple PDU Sessions (e.g., Internet PDU or streaming video PDU, as described above). Additionally, the UE may also obtain BSR tables according to QoS requirements of the multiple PDU sessions (e.g., one BSR table for each of QoS flow 1, QoS flow 2, . . . , QoS flow 6) or traffic type characteristics of the multiple PDU sessions (e.g., one BSR table for video application and one BSR table for streaming video stream).

In some aspects, the multiple BSR tables and the multiple sets of one or more timers may be based on the serving targets of the multiple PDU sessions. The serving targets of the multiple PDU sessions may include one or more of: an internet PDU session, or an on-demand PDU session. For example, referring to FIG. 6, the multiple BSR tables and the one or more timers may be based on the serving targets of the multiple PDU sessions, which may include one or more of an internet PDU session (e.g., the PDU session for video application), or an on-demand PDU session (e.g., streaming video PDU).

In some aspects, the multiple BSR tables and the multiple sets of one or more timers may be based on the traffic type characteristics of the multiple PDU sessions. The traffic type characteristics of the PDU sessions may include one or more of: IPv4, IPv6, IPv4v6, ETH traffic, or unstructured traffic. For example, referring to FIG. 7, when the UE 702 obtains, at 708, multiple BSR tables and multiple sets of one or more timers, the multiple BSR tables and the multiple sets of one or more timers may be based on the traffic type characteristics of the multiple PDU sessions, which may include one or more of: IPv4, IPv6, IPv4v6, ETH traffic, or unstructured traffic.

In some aspects, at 904, the UE may receive a configuration for the multiple BSR tables and the multiple sets of one or more timers based on the characteristics of a link between the UE and the network entity (935). For example, referring to FIG. 7, when the UE 702 obtains, at 708, multiple BSR tables and multiple sets of one or more timers, the UE 702 may, at 709, receive a configuration for the multiple BSR tables and the multiple sets of one or more timers based on the characteristics of a link between the UE 702 and the network entity (base station 704).

In some aspects, the multiple BSR tables and the multiple sets of one or more timers may be based on the characteristics of the link. The characteristics of the link may include: the connection type of the link. The connection type may be the TN connection or the NTN connection. For example, referring to FIG. 7, when the UE 702 obtains, at 708, multiple BSR tables and multiple sets of one or more timers, the multiple BSR tables and the multiple sets of one or more timers may be based on the characteristics of the link. The characteristics of the link may include the connection type of the link, which may be the TN connection or the NTN connection.

In some aspects, the connection type of the link may be the NTN connection, and the multiple BSR tables and the multiple sets of one or more timers may be based on the characteristics of the link. The characteristics of the link may further include one or more of: a latency associated with the NTN connection; a link capacity associated with the NTN connection; and NTN connection characteristics. The NTN connection characteristics may include: complete base stations associated with the NTN connection, reflectors or relays associated with the NTN connection, or a complete network associated with the NTN connection. For example, referring to FIG. 7, the UE 702 may obtain, at 708, multiple BSR tables and multiple sets of one or more timers based on the characteristics of the link. The link may be the NTN connection, and the characteristics of the link may include one or more of: a latency associated with the NTN connection; a link capacity associated with the NTN connection; and NTN connection characteristics. The NTN connection characteristics may include: complete base stations associated with the NTN connection, reflectors or relays associated with the NTN connection, or a complete network associated with the NTN connection.

In some aspects, the connection type of the link may be the TN connection or the NTN connection, and the characteristics of the link on which the multiple BSR tables and the multiple sets of one or more timers are based may further include SCS characteristics within the connection. For example, referring to FIG. 7, the UE 702 may obtain, at 708, multiple BSR tables and multiple sets of one or more timers based on the connection type of the link and the characteristics of the link. The connection type of the link may be the TN connection or the NTN connection, and the characteristics of the link may include SCS characteristics within the connection.

In some aspects, the connection type of the link may be the TN connection or the NTN connection, and the characteristics of the link on which the multiple BSR tables and the multiple sets of one or more timers are based may further include: a frequency band for the connection. The frequency band may include one of: the FR1 frequency band, the FR2 frequency band, or the FR2+ frequency band. For example, referring to FIG. 7, the UE 702 may obtain, at 708, multiple BSR tables and multiple sets of one or more timers based on the connection type of the link and the characteristics of the link. The connection type of the link may be the TN connection or the NTN connection, and the characteristics of the link may include: the frequency band for the connection. The frequency band may include one of: the FR1 frequency band, the FR2 frequency band, or the FR2+ frequency band.

Figure 10:
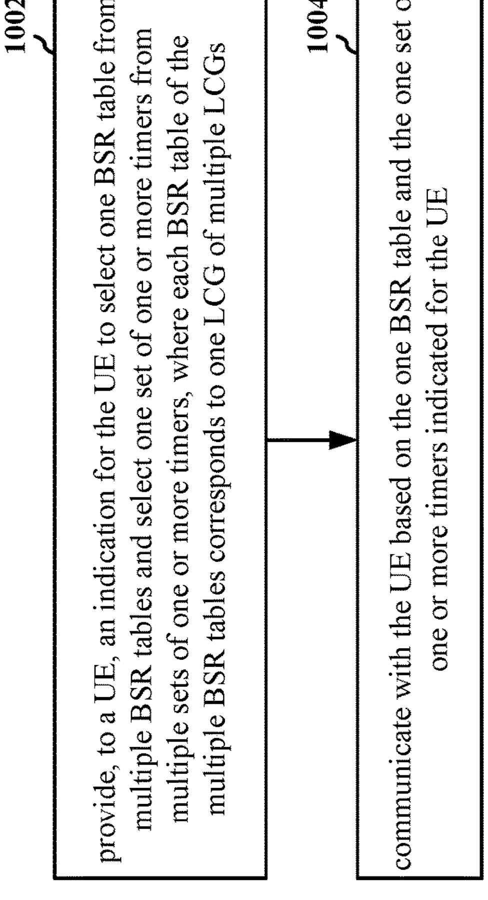
FIG. 10 is a flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 1202 in the hardware implementation of FIG. 12). The method enables a UE to obtain multiple BSR tables and BSR timers and select corresponding BSR tables and timers according to the specific characteristics of the traffic. The method enables the UL data transmission to be flexibly customized according to the operation requirements. Thus, it improves the efficiency of wireless communication.

As shown in FIG. 10, at 1002, the network entity may provide, to a UE, an indication for the UE to select one BSR table from multiple BSR tables and select one set of one or more timers from multiple sets of one or more timers. Each BSR table of the multiple BSR tables may correspond to one LCG of multiple LCGs. The UE may be the UE 104, 350, 702, or the apparatus 1204 in the hardware implementation of FIG. 12. FIG. 7 illustrates various aspects of the steps in connection with flowchart 1000. For example, referring to FIG. 7, the network entity (base station 704) may transmit, at 706, to a UE 702, an indication (a BSR configuration signal) to cause the UE 702 to select (at 712) one BSR table from multiple BSR tables configured for the UE 702 and select (at 714) one set of one or more timers from multiple sets of one or more timers. Each BSR table of the multiple BSR tables may correspond to one LCG of multiple LCGs. In some aspects, 1002 may be performed by the BSR configuration component 199.

At 1004, the network entity may communicate with the UE based on the one BSR table and the one set of one or more timers indicated for the UE. For example, referring to FIG. 7, the network entity (base station 704) may communicate, at 716, with the UE 702 based on the one BSR table and the one set of timers. In some aspects, 1004 may be performed by the BSR configuration component 199.

Figure 11:
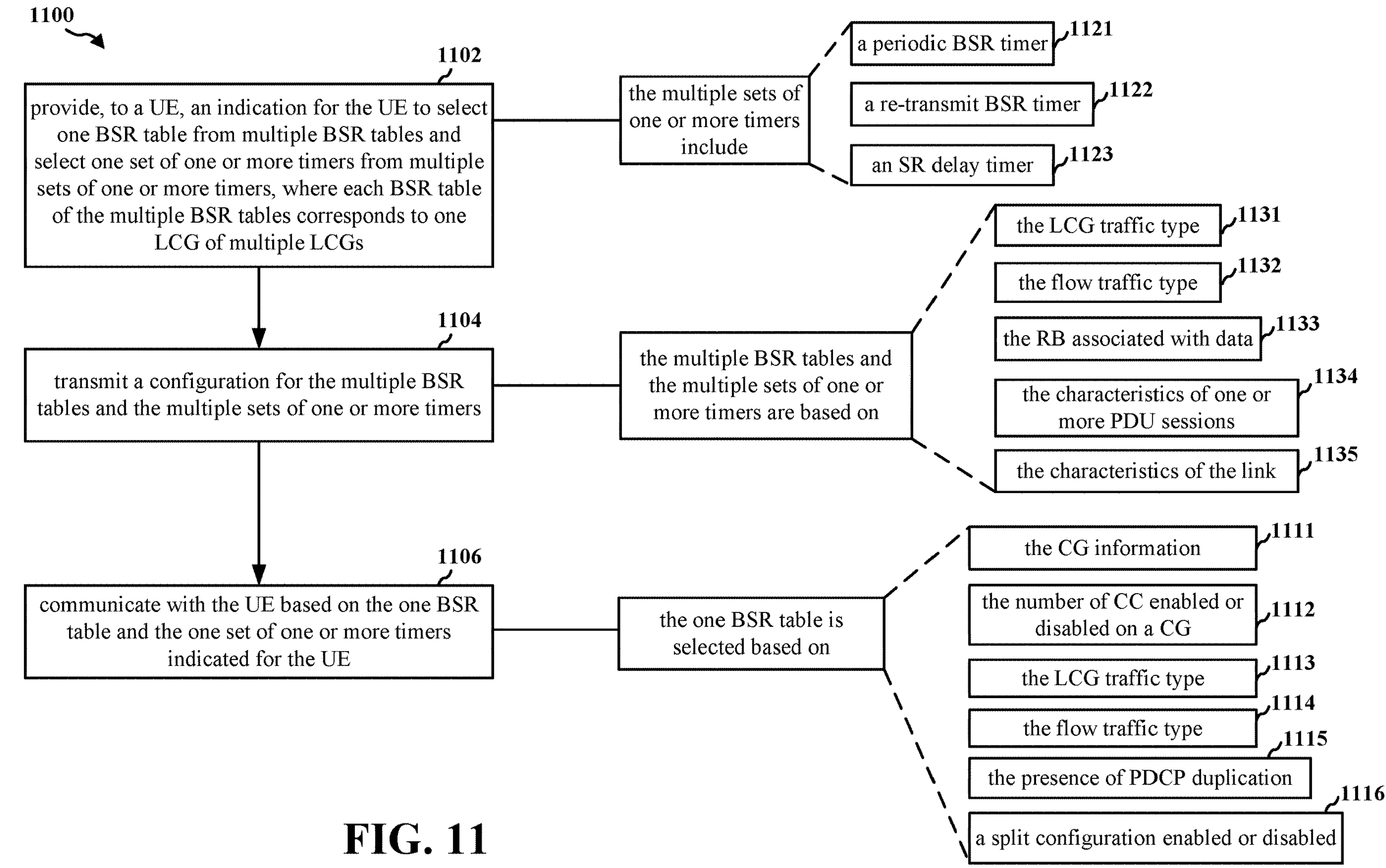
FIG. 11 is a further flowchart illustrating methods of wireless communication at a network entity in accordance with various aspects of the present disclosure.

FIG. 11 is a flowchart 1100 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 1202 in the hardware implementation of FIG. 12). The method enables a UE to obtain multiple BSR tables and BSR timers and select corresponding BSR tables and timers according to the specific characteristics of the traffic. The method enables the UL data transmission to be flexibly customized according to the operation requirements. Thus, it improves the efficiency of wireless communication.

As shown in FIG. 11, at 1102, the network entity may provide, to a UE, an indication for the UE to select one BSR table from multiple BSR tables and select one set of one or more timers from multiple sets of one or more timers. Each BSR table of the multiple BSR tables may correspond to one LCG of multiple LCGs. The UE may be the UE 104, 350, 702, or the apparatus 1204 in the hardware implementation of FIG. 12. FIG. 7 illustrates various aspects of the steps in connection with flowchart 1100. For example, referring to FIG. 7, the network entity (base station 704) may transmit, at 706, to a UE 702, an indication (a BSR configuration signal) to cause the UE 702 to select (at 712) one BSR table from multiple BSR tables configured for the UE 702 and select (at 714) one set of one or more timers from multiple sets of one or more timers. Each BSR table of the multiple BSR tables may correspond to one LCG of multiple LCGs. In some aspects, 1102 may be performed by the BSR configuration component 199.

At 1106, the network entity may communicate with the UE based on the one BSR table and the one set of one or more timers indicated for the UE. For example, referring to FIG. 7, the network entity (base station 704) may communicate, at 716, with the UE 702 based on the one BSR table and the one set of timers. In some aspects, 1106 may be performed by the BSR configuration component 199.

In some aspects, the indication may be included in a MAC-CE or RRC information. For example, referring to FIG. 7, the network entity may transmit, at 710, an indication to the UE 702. The indication may be transmitted through MAC-CE or RRC information.

In some aspects, the selection of one BSR table may be based on one or more of: the CG information (1111); the number of CC enabled or disabled on a CG (1112); the LCG traffic type (1113); the flow traffic type (1114); the presence of PDCP duplication (1115); or a split configuration enabled or disabled (1116). For example, referring to FIG. 7, when the UE 702 selects one BSR table at 712, the one BSR table may be selected based on one or more of: the CG information; the number of CC enabled or disabled on a CG; an LCG traffic type; a flow traffic type; the presence of PDCP duplication; or a split configuration enabled or disabled.

In some aspects, the CG information may include one or more of: use of an MCG, use of an SCG, or use of a DC mechanism. For example, referring to FIG. 7, when the UE 702 selects one BSR table at 712, the one BSR table may be selected based on the CG information that includes one or more of: use of an MCG, use of an SCG, or use of a DC mechanism.

In some aspects, the multiple sets of one or more timers may include one or more of: a periodic BSR timer (1121), a re-transmit BSR timer (1122), or an SR delay timer (1123). For example, referring to FIG. 7, when the UE 702 obtains multiple sets of one or more timers at 708, the multiple sets of one or more timers may include one or more of: a periodic BSR timer, a re-transmit BSR timer, or an SR delay timer.

In some aspects, at 1104, the network entity may transmit a configuration for the multiple BSR tables and the multiple sets of one or more timers based on one or more of: the LCG Traffic type (1131); the flow traffic type (1132); or the RB associated with data (1133). For example, referring to FIG. 7, when the UE 702 obtains multiple BSR tables and multiple sets of one or more timers at 708, the network entity (base station 704) may transmit a configuration at 709 for the multiple BSR tables and the multiple sets of one or more timers based on one or more of: an LCG traffic type; a flow traffic type; or a DRB associated with data. For example, referring to FIG. 6, the UE may obtain one timer for each of the DRBs (e.g., DRB 1, DRB 2, . . . , DRB 5). In some aspects, 1104 may be performed by the BSR configuration component 199.

In some aspects, at 1104, the network entity may transmit a configuration for the multiple BSR tables and the multiple sets of one or more timers based on the characteristics of multiple PDU sessions (1134). For example, referring to FIG. 7, when the UE 702 obtains, at 708, multiple BSR tables and multiple sets of one or more timers, the network entity (base station 704) may transmit a configuration at 709 for the multiple BSR tables and the multiple sets of one or more timers based on the characteristics of multiple PDU sessions. For example, referring to FIG. 6, the UE may obtain one BSR table for each of the PDU sessions (e.g., the Internet PDU, the streaming video PDU, and the IMS PDU).

In some aspects, the characteristics of the multiple PDU sessions may include at least one of: serving targets of the multiple PDU sessions; QoS requirements of the multiple PDU sessions; traffic type characteristics of the multiple PDU sessions; slicing requirements and URSP rules associated with the multiple PDU sessions; or at least one of a slicing instance or a slice type associated with the multiple PDU sessions. For example, referring to FIG. 6, the UE may obtain BSR tables according to serving targets of the multiple PDU Sessions (e.g., Internet PDU or streaming video PDU); QoS requirements of the multiple PDU sessions (e.g., one BSR table for each of QoS flow 1, QoS flow 2, . . . , QoS flow 6); traffic type characteristics of the multiple PDU sessions (e.g., one BSR table for a voice application and one BSR table for streaming video stream).

In some aspects, the serving targets of the multiple PDU sessions include one or more of: an internet PDU session, or an on-demand PDU session. For example, referring to FIG. 6, the multiple BSR tables and the one or more timers may be based on the serving targets of the multiple PDU sessions, which may include one or more of an internet PDU session (e.g., the PDU session for video application), or an on-demand PDU session (e.g., streaming video PDU).

In some aspects, the traffic type characteristics of the multiple PDU sessions on which the multiple BSR tables and the multiple sets of one or more timers are based may include one or more of: IPv4, IPv6, IPv4v6, ETH traffic, or unstructured traffic. For example, referring to FIG. 7, when the UE 702 obtains, at 708, multiple BSR tables and multiple sets of one or more timers, the multiple BSR tables and the multiple sets of one or more timers may be based on the traffic type characteristics of the multiple PDU sessions, which may include one or more of: IPv4, IPv6, IPv4v6, ETH traffic, or unstructured traffic.

In some aspects, at 1104, the network entity may transmit a configuration for the multiple BSR tables and the one or more timers based on the characteristics of a link between the UE and the network entity (1135). For example, referring to FIG. 7, when the UE 702 obtains, at 708, multiple BSR tables and multiple sets of one or more timers, the network entity (base station 704) may transmit a configuration at 709 for the multiple BSR tables and the multiple sets of one or more timers based on the characteristics of a link between the UE 702 and the network entity (base station 704).

In some aspects, the characteristics of the link on which the multiple BSR tables and the multiple sets of one or more timers are based may include the connection type of the link, which may be the TN connection or the NTN connection. For example, referring to FIG. 7, when the UE 702 obtains, at 708, multiple BSR tables and multiple sets of one or more timers, the multiple BSR tables and the multiple sets of one or more timers may be based on the characteristics of the link. The characteristics of the link may include the connection type of the link, which may be the TN connection or the NTN connection.

In some aspects, the connection type of the link may be the NTN connection, and the characteristics of the link on which the multiple BSR tables and the multiple sets of one or more timers are based further include one or more of: the latency associated with the NTN connection; the link capacity associated with the NTN connection; or NTN connection characteristics, which may include: complete base stations associated with the NTN connection, reflectors or relays associated with the NTN connection, or a complete network associated with the NTN connection. For example, referring to FIG. 7, the UE 702 may obtain, at 708, multiple BSR tables and multiple sets of one or more timers based on the characteristics of the link. The link may be the NTN connection, and the characteristics of the link may include one or more of: a latency associated with the NTN connection; a link capacity associated with the NTN connection; and NTN connection characteristics. The NTN connection characteristics may include: complete base stations associated with the NTN connection, reflectors or relays associated with the NTN connection, or a complete network associated with the NTN connection.

In some aspects, the connection type of the link may be the TN connection or the NTN connection, and the characteristics of the link on which the multiple BSR tables and the multiple sets of one or more timers are based may further include SCS characteristics within the connection type. For example, referring to FIG. 7, the UE 702 may obtain, at 708, multiple BSR tables and multiple sets of one or more timers based on the connection type of the link and the characteristics of the link. The connection type of the link may be the TN connection or the NTN connection, and the characteristics of the link may include SCS characteristics within the connection.

In some aspects, the connection type of the link may be the TN connection or the NTN connection, and the characteristics of the link on which the multiple BSR tables and the multiple sets of one or more timers are based may further include: the frequency band for the connection. The frequency band may include one of: the FR1 frequency band, the FR2 frequency band, or the FR2+ frequency band. For example, referring to FIG. 7, the UE 702 may obtain, at 708, multiple BSR tables and multiple sets of one or more timers based on the connection type of the link and the characteristics of the link. The connection type of the link may be the TN connection or the NTN connection, and the characteristics of the link may include: the frequency band for the connection. The frequency band may include one of: the FR1 frequency band, the FR2 frequency band, or the FR2+ frequency band.

Figure 12:
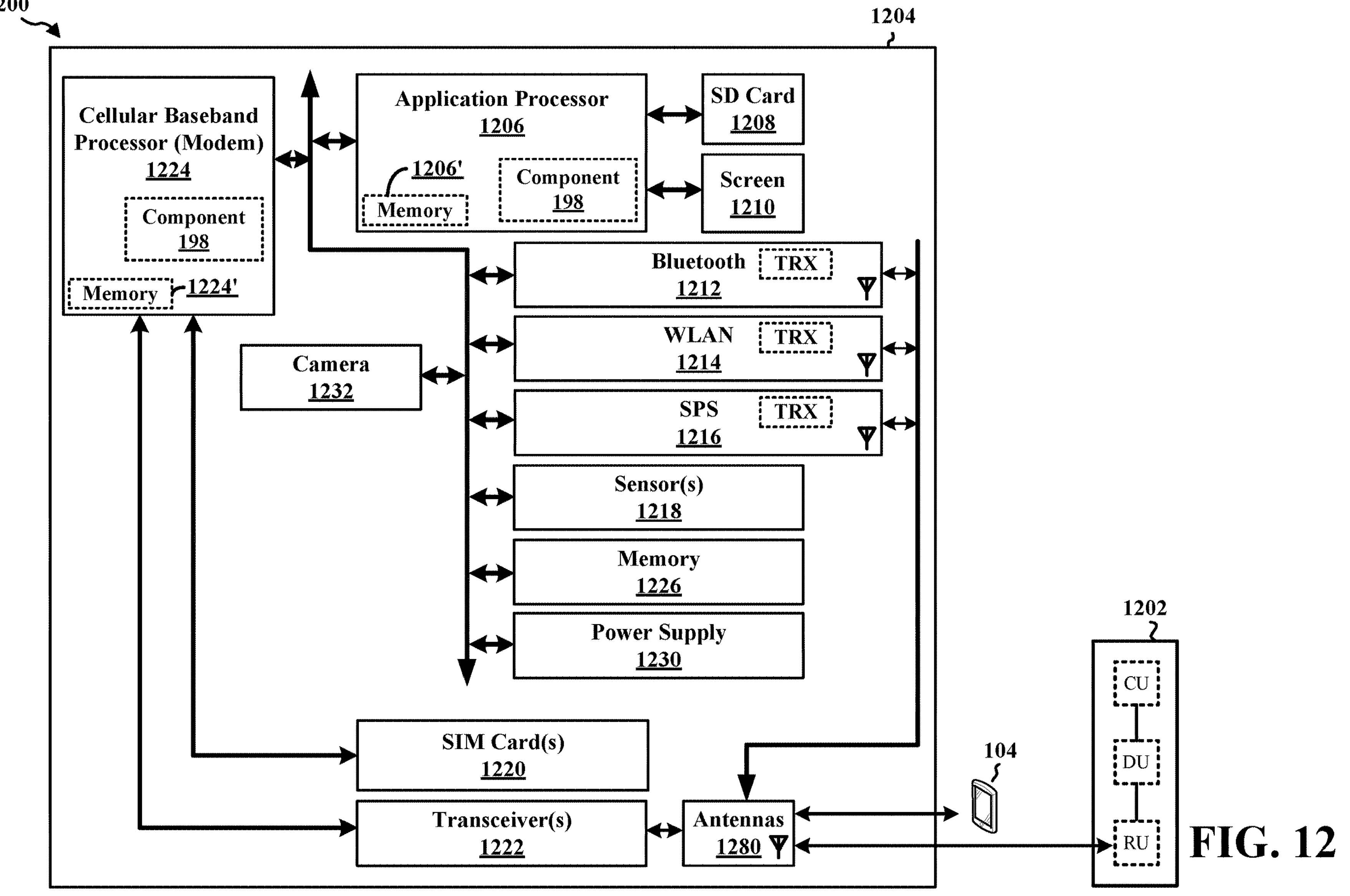
FIG. 12 is a diagram illustrating an example of a hardware implementation for an example apparatus and/or UE.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor (or processing circuitry) 1224 (also referred to as a modem) coupled to one or more transceivers 1222 (e.g., cellular RF transceiver). The cellular baseband processor(s) (or processing circuitry) 1224 may include at least one on-chip memory (or memory circuitry) 1224'. In some aspects, the apparatus 1204 may further include one or more subscriber identity modules (SIM) cards 1220 and at least one application processor (or processing circuitry) 1206 coupled to a secure digital (SD) card 1208 and a screen 1210. The application processor(s) (or processing circuitry) 1206 may include on-chip memory (or memory circuitry) 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) (or processing circuitry) 1224 communicates through the transceiver(s) 1222 via one or more antennas 1280 with the UE 104 and/or with an RU associated with a network entity 1202. The cellular baseband processor(s) (or processing circuitry) 1224 and the application processor(s) (or processing circuitry) 1206 may each include a computer-readable medium/memory (or memory circuitry) 1224', 1206', respectively. The additional memory modules 1226 may also be considered a computer-readable medium/memory (or memory circuitry). Each computer-readable medium/memory (or memory circuitry) 1224', 1206', 1226 may be non-transitory. The cellular baseband processor(s) (or processing circuitry) 1224 and the application processor(s) (or processing circuitry) 1206 are each responsible for general processing, including the execution of software stored on the computer-readable medium/memory (or memory circuitry). The software, when executed by the cellular baseband processor(s) (or processing circuitry) 1224/application processor(s) (or processing circuitry) 1206, causes the cellular baseband processor(s) (or processing circuitry) 1224/application processor(s) (or processing circuitry) 1206 to perform the various functions described supra. The cellular baseband processor(s) (or processing circuitry) 1224 and the application processor(s) (or processing circuitry) 1206 are configured to perform the various functions described supra based at least in part of the information stored in the memory (or memory circuitry). That is, the cellular baseband processor(s) (or processing circuitry) 1224 and the application processor(s) (or processing circuitry) 1206 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1224/application processor(s) (or processing circuitry) 1206 when executing software. The cellular baseband processor(s) (or processing circuitry) 1224/application processor(s) (or processing circuitry) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) (or processing circuitry) 1224 and/or the application processor(s) (or processing circuitry) 1206, and in another configuration, the apparatus 1204 may be the entire UE (e.g., see UE 350 of FIG. 3) and include the additional modules of the apparatus 1204.

As discussed supra, the component 198 may be configured to obtain multiple BSR tables and one or more timers, where each BSR table of the multiple BSR tables corresponds to one LCG of multiple LCGs; select one BSR table from the multiple BSR tables; select one set of timers from the one or more timers; and communicate, based on the one BSR table and the one set of timers, with a network entity. The component 198 may be further configured to perform any of the aspects described in connection with the flowcharts in FIG. 8 and FIG. 9, and/or performed by the UE 702 in FIG. 7. The component 198 may be within the cellular baseband processor(s) (or processing circuitry) 1224, the application processor(s) (or processing circuitry) 1206, or both the cellular baseband processor(s) (or processing circuitry) 1224 and the application processor(s) (or processing circuitry) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) (or processing circuitry) 1224 and/or the application processor(s) (or processing circuitry) 1206, includes means for obtaining multiple BSR tables and one or more timers, where each BSR table of the multiple BSR tables corresponds to one LCG of multiple LCGs, means for selecting one BSR table from the multiple BSR tables, means for selecting one set of timers from the one or more timers, and means for communicating, based on the one BSR table and the one set of timers, with a network entity. The apparatus 1204 may further include means for performing any of the aspects described in connection with the flowcharts in FIG. 8 and FIG. 9, and/or aspects performed by the UE 702 in FIG. 7. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
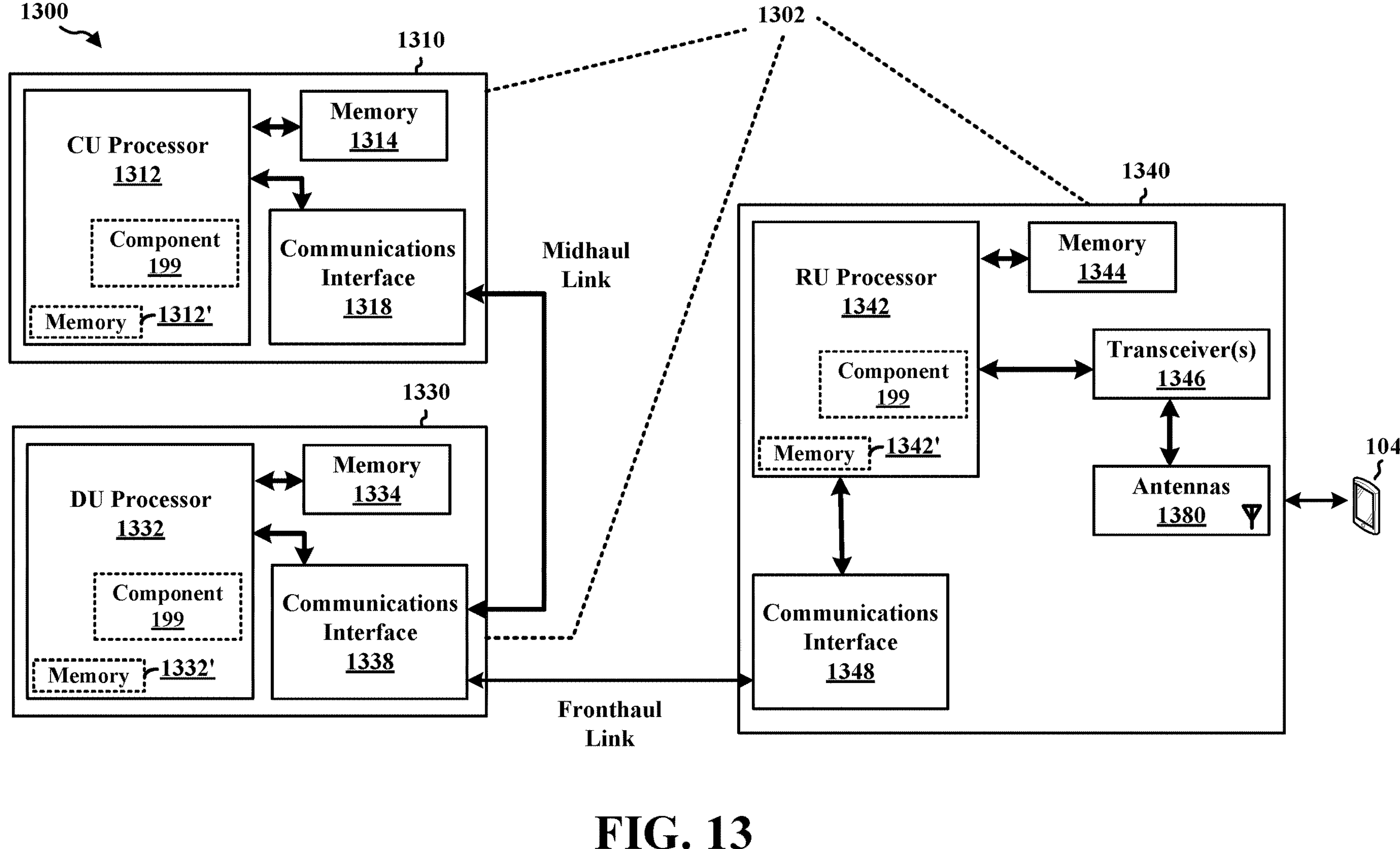
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor (or processing circuitry) 1312. The CU processor(s) (or processing circuitry) 1312 may include on-chip memory (or memory circuitry) 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor (or processing circuitry) 1332. The DU processor(s) (or processing circuitry) 1332 may include on-chip memory (or memory circuitry) 1332'. In some aspects, the DU 1330 may further include additional memory modules 1334 and a communications interface 1338. The DU 1330 communicates with the RU 1340 through a fronthaul link. The RU 1340 may include at least one RU processor (or processing circuitry) 1342. The RU processor(s) (or processing circuitry) 1342 may include on-chip memory (or memory circuitry) 1342'. In some aspects, the RU 1340 may further include additional memory modules 1344, one or more transceivers 1346, antennas 1380, and a communications interface 1348. The RU 1340 communicates with the UE 104. The on-chip memory (or memory circuitry) 1312', 1332', 1342' and the additional memory modules 1314, 1334, 1344 may each be considered a computer-readable medium/memory (or memory circuitry). Each computer-readable medium/memory (or memory circuitry) may be non-transitory. Each of the processors (or processing circuitry) 1312, 1332, 1342 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to transmit, to a UE, a BSR configuration signal to cause the UE to select one BSR table from multiple BSR tables configured for the UE and select one set of timers from one or more timers, where each BSR table of the multiple BSR tables corresponds to one LCG of multiple LCGs; and communicate, based on the one BSR table and the one set of timers configured for the UE, with the UE. The component 199 may be further configured to perform any of the aspects described in connection with the flowcharts in FIG. 10 and FIG. 11, and/or performed by the base station 704 in FIG. 7. The component 199 may be within one or more processors (or processing circuitry) of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 includes means for transmitting, to a UE, a BSR configuration signal to cause the UE to select one BSR table from multiple BSR tables configured for the UE and select one set of timers from one or more timers, where each BSR table of the multiple BSR tables corresponds to one LCG of multiple LCGs, and means for communicating, based on the one BSR table and the one set of timers configured for the UE, with the UE. The network entity 1302 may further include means for performing any of the aspects described in connection with the flowcharts in FIG. 10 and FIG. 11, and/or aspects performed by the base station 704 in FIG. 7. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include configuring multiple BSR tables and one or more timers, where each BSR table of the multiple BSR tables corresponds to one LCG of multiple LCGs; selecting one BSR table from the multiple BSR tables; selecting one set of timers from the one or more timers; and communicating, based on the one BSR table and the one set of timers, with a network entity. The method enables the UE to obtain multiple BSR tables and BSR timers and select corresponding BSR tables and timers according to the specific characteristics of the traffic. The method enables the UL data transmission to be flexibly customized according to the operation requirements. Thus, it improves the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather “one or more.” Terms such as “if,” “when,” and “while” do not imply an immediate temporal relationship or reaction. That is, these phrases, e.g., “when,” do not imply an immediate action in response to or during the occurrence of an action, but simply imply that if a condition is met then an action will occur, but without requiring a specific or immediate time constraint for the action to occur. The word “exemplary” is used herein to mean “serving as an example, instance, or illustration.” Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes obtaining multiple BSR tables and multiple sets of one or more timers, where each BSR table of the multiple BSR tables corresponds to one LCG of multiple LCGs; and communicating with a network entity based on one BSR table selected from the multiple BSR tables and one set of timers selected from the multiple sets of one or more timers.

Aspect 2 is the method of aspect 1, where a selection of the one BSR table may be based on an indication received through MAC-CE or RRC information.

Aspect 3 is the method of any of aspects 1 to 2, where the selection of the one BSR table may be based on one or more of: CG information; a number of CC enabled or disabled on a CG; an LCG traffic type; a flow traffic type; a presence of PDCP duplication; or a split configuration enabled or disabled.

Aspect 4 is the method of aspect 3, where the selection of the one BSR table may be based on the CG information, and the CG information may include one or more of: use of an MCG, use of an SCG, or use of a DC mechanism.

Aspect 5 is the method of any of aspects 1 to 4, where the multiple sets of one or more timers may include one or more of: a periodic BSR timer, a re-transmit BSR timer, or an SR delay timer.

Aspect 6 is the method of any of aspects 1 to 5, where the method may further include receiving a configuration for the multiple BSR tables and the multiple sets of one or more timers based on one or more of: an LCG traffic type; a flow traffic type; or a radio bearer (RB) associated with data.

Aspect 7 is the method of any of aspects 1 to 5, where the method may further include receiving a configuration for the multiple BSR tables and the multiple sets of one or more timers based on characteristics of multiple PDU sessions.

Aspect 8 is the method of aspect 7, where the characteristics of the multiple PDU sessions on which the multiple BSR tables and the multiple sets of one or more timers are based may include at least one of: serving targets of the multiple PDU sessions; Quality of Service (QOS) requirements of the multiple PDU sessions; traffic type characteristics of the multiple PDU sessions; slicing requirements and UE route selection policy (URSP) rules associated with the multiple PDU sessions; or at least one of a slice instance or a slice type associated with the multiple PDU sessions.

Aspect 9 is the method of aspect 8, where the multiple BSR tables and the multiple sets of one or more timers may be based on the serving targets of the multiple PDU sessions, which may include one or more of: an internet PDU session, or an on-demand PDU session.

Aspect 10 is the method of aspect 8, where the multiple BSR tables and the multiple sets of one or more timers may be based on the traffic type characteristics of the multiple PDU sessions, which may include one or more of: IPv4, IPv6, IPv4v6, ETH traffic, or unstructured traffic.

Aspect 11 is the method of any of aspects 1 to 5, where the method further includes receiving a configuration for the multiple BSR tables and the multiple sets of one or more timers based on characteristics of a link between the UE and the network entity.

Aspect 12 is the method of aspect 11, where the multiple BSR tables and the multiple sets of one or more timers may be based on the characteristics of the link, which may include a connection type of the link. The connection type may be a TN connection or an NTN connection.

Aspect 13 is the method of aspect 12, where the connection type of the link may be the NTN connection. The multiple BSR tables and the multiple sets of one or more timers may be based on the characteristics of the link, which may include one or more of: a latency associated with the NTN connection; a link capacity associated with the NTN connection; and NTN connection characteristics, which may include complete base stations associated with the NTN connection, reflectors or relays associated with the NTN connection, or a complete network associated with the NTN connection.

Aspect 14 is the method of aspect 12, where the connection type of the link may be the TN connection or the NTN connection, and the characteristics of the link on which the multiple BSR tables and the multiple sets of one or more timers are based may further include SCS characteristics of the connection type.

Aspect 15 is the method of aspect 12, where the connection type of the link may be the TN connection or the NTN connection, and the characteristics of the link on which the multiple BSR tables and the multiple sets of one or more timers are based may further include: a frequency band for the connection type.

Aspect 16 is an apparatus for wireless communication at a UE, comprising: a processing system that includes processor circuitry and memory circuitry that stores code and is coupled with the processor circuitry, the processing system configured to cause the UE to perform the method of one or more of aspects 1-15.

Aspect 17 is an apparatus for wireless communication at a UE, comprising: at least one memory; and at least one processor coupled to the at least one memory and, where the at least one processor, individually or in any combination, is configured to perform the method of any of aspects 1-15.

Aspect 18 is the apparatus for wireless communication at a UE, comprising means for obtaining multiple buffer status reporting (BSR) tables and multiple sets of one or more timers, wherein each BSR table of the multiple BSR tables corresponds to one logic channel group (LCG) of multiple LCGs, and means for communicate with a network entity based on one BSR table selected from the multiple BSR tables and one set of timers selected from the multiple sets of one or more timers.

Aspect 19 is the apparatus of aspect 18, further comprising means for performing each step in the method of any of aspects 2-15.

Aspect 20 is an apparatus of any of aspects 16-19, further comprising a transceiver configured to receive or to transmit in association with the method of any of aspects 1-15.

Aspect 21 is a computer-readable medium (e.g., a non-transitory computer-readable medium) storing computer executable code at a UE, the code when executed by at least one processor causes the at least one processor to, individually or in any combination, perform the method of any of aspects 1-15.

Aspect 22 is a method of wireless communication at a network entity. The method may include providing, to a UE, an indication for the UE to select one BSR table from multiple BSR tables and select one set of one or more timers from multiple sets of one or more timers, where each BSR table of the multiple BSR tables corresponds to one LCG of multiple LCGs; and communicating with the UE based on the one BSR table and the one set of one or more timers indicated for the UE.

Aspect 23 is the method of aspect 22, where the indication may be comprised in a MAC-CE or RRC information.

Aspect 24 is the method of any of aspects 22 to 23, where a selection of the one BSR table may be based on one or more of: CG information; a number of CC enabled or disabled on a CG; an LCG traffic type; a flow traffic type; a presence of PDCP duplication; or a split configuration enabled or disabled.

Aspect 25 is the method of aspect 24, where the CG information may include one or more of: use of an MCG, use of an SCG, or use of a DC mechanism.

Aspect 26 is the method of any of aspects 22 to 25, where the multiple sets of one or more timers may include one or more of: a periodic BSR timer, a re-transmit BSR timer, or an SR delay timer.

Aspect 27 is the method of any of aspects 22 to 26, where the method further includes transmitting a configuration for the multiple BSR tables and the multiple sets of one or more timers based on one or more of: an LCG Traffic type; a flow traffic type; or an RB associated with data.

Aspect 28 is the method of any of aspects 22 to 26, where the method further includes transmitting a configuration for the multiple BSR tables and the multiple sets of one or more timers based on characteristics of multiple PDU sessions.

Aspect 29 is the method of aspect 28, where the characteristics of the multiple PDU sessions on which the multiple BSR tables and the multiple sets of one or more timers are based may include at least one of: serving targets of the multiple PDU sessions; QoS requirements of the multiple PDU sessions; traffic type characteristics of the multiple PDU sessions; slicing requirements and URSP rules associated with the multiple PDU sessions; or at least one of a slicing instance or a slice type associated with the multiple PDU sessions.

Aspect 30 is the method of aspect 29, where the serving targets of the multiple PDU sessions may include one or more of: an internet PDU session, or an on-demand PDU session.

Aspect 31 is the method of aspect 29, where the traffic type characteristics of the multiple PDU sessions on which the multiple BSR tables and the multiple sets of one or more timers are based may include one or more of: IPv4, IPv6, IPv4v6, ETH traffic, or unstructured traffic.

Aspect 32 is the method of any of aspects 22 to 27, where the method further includes transmitting a configuration for the multiple BSR tables and the multiple sets of one or more timers based on characteristics of a link between the UE and the network entity.

Aspect 33 is the method of aspect 32, where the characteristics of the link on which the multiple BSR tables and the multiple sets of one or more timers are based may include: a connection type of the link, where the connection type may be a TN connection or an NTN connection.

Aspect 34 is the method of aspect 33, where the connection type of the link may be the NTN connection, and the characteristics of the link on which the multiple BSR tables and the multiple sets of one or more timers are based may further include one or more of: a latency associated with the NTN connection; a link capacity associated with the NTN connection; or NTN connection characteristics, including: complete base stations associated with the NTN connection, reflectors or relays associated with the NTN connection, or a complete network associated with the NTN connection.

Aspect 35 is the method of aspect 33, where the connection type of the link may be the TN connection or the NTN connection, and the characteristics of the link on which the multiple BSR tables and the multiple sets of one or more timers are based may further include SCS characteristics within the connection type.

Aspect 36 is the method of aspect 33, where the connection type of the link may be the TN connection or the NTN connection, and the characteristics of the link on which the multiple BSR tables and the multiple sets of one or more timers are based may further include: a frequency band for the connection.

Aspect 37 is an apparatus for wireless communication at a network entity, comprising: a processing system that includes processor circuitry and memory circuitry that stores code and is coupled with the processor circuitry, the processing system configured to cause the network entity to perform the method of one or more of aspects 22-36.

Aspect 38 is an apparatus for wireless communication at a network entity, comprising: at least one memory; and at least one processor coupled to the at least one memory and, where the at least one processor, individually or in any combination, is configured to perform the method of any of aspects 22-36.

Aspect 39 is an apparatus for wireless communication at a network entity, comprising means for providing, to a user equipment (UE), an indication for the UE to select one buffer status report (BSR) table from multiple BSR tables and select one set of one or more timers from multiple sets of one or more timers, wherein each BSR table of the multiple BSR tables corresponds to one logic channel group (LCG) of multiple LCGs, and means for communicating with the UE based on the one BSR table and the one set of one or more timers indicated for the UE.

Aspect 40 is the apparatus of aspect 39, further comprising means for performing each step in the method of any of aspects 23-36.

Aspect 41 is an apparatus of any of aspects 37-40, further comprising a transceiver configured to receive or to transmit in association with the method of any of aspects 22-36.

Aspect 42 is a computer-readable medium (e.g., a non-transitory computer-readable medium) storing computer executable code at a network entity, the code when executed by at least one processor causes the at least one processor to, individually or in any combination, perform the method of any of aspects 22-36.

What is claimed is:

1. An apparatus for wireless communication at a user equipment (UE), comprising:
- at least one memory; and
- at least one processor coupled to the at least one memory and, based at least in part on information stored in the at least one memory, the at least one processor is configured to cause the UE to:
  - receive a configuration for multiple buffer status reporting (BSR) tables and multiple sets of one or more timers, wherein each BSR table of the multiple BSR tables corresponds to one logic channel group (LCG) of multiple LCGs, and wherein the multiple BSR tables and the multiple sets of one or more timers are based on one or more of:
    - an LCG traffic type,
    - a flow traffic type,
    - a radio bearer (RB) associated with data,
    - characteristics of multiple protocol data unit (PDU) sessions, or
    - a connection type of a link between the UE and a network entity, wherein the connection type is a terrestrial network (TN) connection or a non-terrestrial network (NTN) connection; and
  - communicate with the network entity based on one BSR table selected from the multiple BSR tables and one set of timers selected from the multiple sets of one or more timers.

2. The apparatus of claim 1, further comprising a transceiver coupled to the at least one processor, wherein the at least one processor is configured to cause the UE to communicate with the network entity via the transceiver, and wherein a selection of the one BSR table is based on an indication received through medium access control-control element (MAC-CE) or radio resource control (RRC) information.

3. The apparatus of claim 2, wherein the selection of the one BSR table is based on one or more of:
- cell group (CG) information;
- a number of carrier component (CC) enabled or disabled on a CG;
- the LCG traffic type;
- the flow traffic type;
- a presence of packet data convergence protocol (PDCP) duplication; or
- a split configuration enabled or disabled.

4. The apparatus of claim 3, wherein the selection of the one BSR table is based on the CG information that includes one or more of:
- use of a primary cell group (MCG),
- use of a secondary cell group (SCG), or
- use of a dual-connectivity (DC) mechanism.

5. The apparatus of claim 1, wherein the multiple sets of one or more timers include one or more of:
- a periodic BSR timer,
- a re-transmit BSR timer, or
- a scheduling request (SR) delay timer.

6. The apparatus of claim 1, wherein
- the configuration for the multiple BSR tables and the multiple sets of one or more timers is based on one or more of:
- the LCG traffic type;
- the flow traffic type; or
- the RB associated with data.

7. The apparatus of claim 1, wherein
- the configuration for the multiple BSR tables and the multiple sets of one or more timers is based on the characteristics of multiple PDU sessions.

8. The apparatus of claim 7, wherein the characteristics of the multiple PDU sessions on which the multiple BSR tables and the multiple sets of one or more timers are based include at least one of:
- serving targets of the multiple PDU sessions;
- Quality of Service (QoS) requirements of the multiple PDU sessions;
- traffic type characteristics of the multiple PDU sessions;
- slicing requirements and UE route selection policy (URSP) rules associated with the multiple PDU sessions; or
- at least one of a slice instance or a slice type associated with the multiple PDU sessions.

9. The apparatus of claim 8, wherein the multiple BSR tables and the multiple sets of one or more timers are based on the serving targets of the multiple PDU sessions, the serving targets of the multiple PDU sessions comprising one or more of:
- an internet PDU session, or
- an on-demand PDU session.

10. The apparatus of claim 8, wherein the multiple BSR tables and the multiple sets of one or more timers are based on the traffic type characteristics of the multiple PDU sessions, the traffic type characteristics of the multiple PDU sessions comprising one or more of:
- Internet Protocol version 4 (IPv4),
- Internet Protocol version 6 (IPv6),
- IPv4 & IPv6 (IPv4v6),
- Ethernet (ETH) traffic, or
- unstructured traffic.

11. The apparatus of claim 1, wherein
- the configuration for the multiple BSR tables and the multiple sets of one or more timers is based on the connection type of the link between the UE and the network entity.

12. The apparatus of claim 11, wherein the connection type of the link is the NTN connection, and wherein the characteristics of the link on which the multiple BSR tables and the multiple sets of one or more timers are based comprise one or more of:

a latency associated with the NTN connection;

a link capacity associated with the NTN connection; and

NTN connection characteristics comprising:

complete base stations associated with the NTN connection, reflectors or relays associated with the NTN connection, or a complete network associated with the NTN connection.

13. The apparatus of claim 11, wherein the connection type of the link is the TN connection or the NTN connection, and wherein the characteristics of the link on which the multiple BSR tables and the multiple sets of one or more timers are based further include:

subcarrier spacing (SCS) characteristics of the connection type.

14. The apparatus of claim 11, wherein the connection type of the link is the TN connection or the NTN connection, and wherein the characteristics of the link on which the multiple BSR tables and the multiple sets of one or more timers are based further include:

a frequency band for the connection type.

15. An apparatus for wireless communication at a network entity, comprising:

at least one memory; and at least one processor coupled to the at least one memory and, based at least in part on information stored in the at least one memory, the at least one processor is configured to cause the network entity to:

provide, to a user equipment (UE), an indication for the UE to select one buffer status report (BSR) table from multiple BSR tables and select one set of one or more timers from multiple sets of one or more timers, wherein each BSR table of the multiple BSR tables corresponds to one logic channel group (LCG) of multiple LCGs;

transmit a configuration for the multiple BSR tables and the multiple sets of one or more timers based on one or more of:

an LCG traffic type, a flow traffic type, a radio bearer (RB) associated with data, characteristics of multiple protocol data unit (PDU) sessions, or a connection type of a link between the UE and the network entity, wherein the connection type is a terrestrial network (TN) connection or a non-terrestrial network (NTN) connection; and communicate with the UE based on the one BSR table and the one set of one or more timers indicated for the UE.

16. The apparatus of claim 15, further comprising a transceiver coupled to the at least one processor, wherein, to provide the indication, the at least one processor, is configured to cause the network entity to transmit the indication via the transceiver, and wherein the indication is comprised in a medium access control-control element (MAC-CE) or radio resource control (RRC) information.

17. The apparatus of claim 16, wherein a selection of the one BSR table is based on one or more of:

cell group (CG) information;

a number of carrier component (CC) enabled or disabled on a CG;

the LCG traffic type;

the flow traffic type;

a presence of packet data convergence protocol (PDCP) duplication; or a split configuration enabled or disabled.

18. The apparatus of claim 17, wherein the CG information includes one or more of:

use of a primary Cell Group (MCG), use of a secondary Cell Group (SCG), or use of a dual-connectivity (DC) mechanism.

19. The apparatus of claim 15, wherein the multiple sets of one or more timers include one or more of:

a periodic BSR timer, a re-transmit BSR timer, or a scheduling request (SR) delay timer.

20. The apparatus of claim 15, wherein the configuration for the multiple BSR tables and the multiple sets of one or more timers is based on one or more of:

the LCG Traffic type;

the flow traffic type; or the RB associated with data.

21. The apparatus of claim 15, wherein the configuration for the multiple BSR tables and the multiple sets of one or more timers is based on the characteristics of multiple PDU sessions.

22. The apparatus of claim 21, wherein the characteristics of the multiple PDU sessions on which the multiple BSR tables and the multiple sets of one or more timers are based include at least one of:

serving targets of the multiple PDU sessions;

Quality of Service (QoS) requirements of the multiple PDU sessions;

traffic type characteristics of the multiple PDU sessions;

slicing requirements and UE route selection policy (URSP) rules associated with the multiple PDU sessions; or at least one of a slicing instance or a slice type associated with the multiple PDU sessions.

23. The apparatus of claim 22, wherein the serving targets of the multiple PDU sessions include one or more of:

an internet PDU session, or an on-demand PDU session.

24. The apparatus of claim 22, wherein the traffic type characteristics of the multiple PDU sessions on which the multiple BSR tables and the multiple sets of one or more timers are based include one or more of:

Internet Protocol version 4 (IPv4),

Internet Protocol version 6 (IPv6),

IPv4 & IPv6 (IPv4v6),

Ethernet (ETH) traffic, or unstructured traffic.

25. The apparatus of claim 15, wherein the configuration for the multiple BSR tables and the multiple sets of one or more timers is based on the connection type of the link between the UE and the network entity.

26. The apparatus of claim 25, wherein the connection type of the link is the NTN connection, and wherein the characteristics of the link on which the multiple BSR tables and the multiple sets of one or more timers are based further include one or more of:

a latency associated with the NTN connection;

a link capacity associated with the NTN connection; or

NTN connection characteristics, including:

complete base stations associated with the NTN connection, reflectors or relays associated with the NTN connection, or a complete network associated with the NTN connection.

27. The apparatus of claim 25, wherein the connection type of the link is the TN connection or the NTN connection, and wherein the characteristics of the link on which the multiple BSR tables and the multiple sets of one or more timers are based further include:

subcarrier spacing (SCS) characteristics within the connection type.

28. The apparatus of claim 25, wherein the connection type of the link is the TN connection or the NTN connection, and wherein the characteristics of the link on which the multiple BSR tables and the multiple sets of one or more timers are based further include:

a frequency band for the connection type.

29. A method of wireless communication at a user equipment (UE), comprising:

receiving a configuration for multiple buffer status reporting (BSR) tables and multiple sets of one or more timers, wherein each BSR table of the multiple BSR tables corresponds to one logic channel group (LCG) of multiple LCGs, and wherein the multiple BSR tables and the multiple sets of one or more timers are based on one or more of:

an LCG traffic type, a flow traffic type, a radio bearer (RB) associated with data, characteristics of multiple protocol data unit (PDU) sessions, or a connection type of a link between the UE and a network entity, wherein the connection type is a terrestrial network (TN) connection or a non-terrestrial network (NTN) connection; and communicating with the network entity based on one BSR table selected from the multiple BSR tables and one set of timers selected from the multiple sets of one or more timers.

30. The method of claim 29, wherein a selection of the one BSR table is based on an indication received through medium access control-control element (MAC-CE) or radio resource control (RRC) information.

31. The method of claim 30, wherein the selection of the one BSR table is based on one or more of:

cell group (CG) information;

a number of carrier component (CC) enabled or disabled on a CG;

the LCG traffic type;

the flow traffic type;

a presence of packet data convergence protocol (PDCP) duplication; or a split configuration enabled or disabled.

32. A method of wireless communication at a network entity, comprising:

providing, to a user equipment (UE), an indication for the UE to select one buffer status report (BSR) table from multiple BSR tables and select one set of one or more timers from multiple sets of one or more timers, wherein each BSR table of the multiple BSR tables corresponds to one logic channel group (LCG) of multiple LCGs;

transmitting a configuration for the multiple BSR tables and the multiple sets of one or more timers based on one or more of:

an LCG traffic type, a flow traffic type, a radio bearer (RB) associated with data, characteristics of multiple protocol data unit (PDU) sessions, or a connection type of a link between the UE and the network entity, wherein the connection type is a terrestrial network (TN) connection or a non-terrestrial network (NTN) connection; and communicating with the UE based on the one BSR table and the one set of one or more timers indicated for the UE.

* * * * *